(12) United States Patent
Nakamura et al.

(10) Patent No.: US 7,515,185 B2
(45) Date of Patent: Apr. 7, 2009

(54) SOLID-STATE IMAGING DEVICE

(75) Inventors: Nobuo Nakamura, Kanagawa (JP); Tomoyuki Umeda, Kanagawa (JP); Keiji Mabuchi, Kanagawa (JP); Hiroaki Fujita, Kanagawa (JP); Takashi Abe, Kanagawa (JP); Eiichi Funatsu, Tokyo (JP); Hiroki Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 672 days.

(21) Appl. No.: 10/509,977

(22) PCT Filed: Apr. 4, 2003

(86) PCT No.: PCT/JP03/04338

§ 371 (c)(1), (2), (4) Date: Mar. 14, 2005

(87) PCT Pub. No.: WO03/085964

PCT Pub. Date: Oct. 16, 2003

(65) Prior Publication Data

US 2005/0224841 A1  Oct. 13, 2005

(30) Foreign Application Priority Data

Apr. 4, 2002 (JP) ............................. 2002-102046

(51) Int. Cl.
*H04N 5/335* (2006.01)
*H01L 27/148* (2006.01)
(52) U.S. Cl. ..................................... 348/294; 257/215
(58) Field of Classification Search ................. 348/215, 348/294, 370; 257/215, 233
See application file for complete search history.

(56) References Cited

U.S. PATENT DOCUMENTS 5,469,484 A  11/1995  Sato et al.

(Continued)

FOREIGN PATENT DOCUMENTS

JP  63-124685  5/1988

(Continued)

*Primary Examiner*—Nhan T. Tran
*Assistant Examiner*—Trung Diep
(74) *Attorney, Agent, or Firm*—Robert J. Depke; Rockey, Depke & Lyons, LLC

(57) ABSTRACT

A solid-state imaging device for enlarging an operating margin of a pixel portion and achieving complete transfer of a signal charge by using a plurality of power supply voltages, wherein a plurality of power supplies having different power supply voltage values are supplied to portions of a semiconductor chip 1. For example, as a first power supply system, a first digital power supply voltage (DVDD1) is supplied from a power supply terminal 45, a first digital ground voltage (DVSS1) is supplied from a power supply terminal 46, a second digital power supply voltage (DVDD2) is supplied from a power supply terminal 47, a second digital ground voltage (DVSS2) is supplied from a power supply terminal 48, a third digital power supply (DVDD3) is supplied from a power supply terminal 49, and a third digital ground voltage (DVSS3) is supplied from a power supply terminal 50, and as a second power supply system, a first analog power supply voltage (AVDD1) is supplied from a power supply terminal 40, a first analog ground voltage (AVSS1) is supplied from a power supply terminal 41, a second analog power supply voltage (AVDD2) is supplied from a power supply terminal 42, and a second analog ground voltage (AVSS2) is supplied from a power supply terminal 43.

18 Claims, 25 Drawing Sheets

U.S. PATENT DOCUMENTS

| | | | |
|---|---|---|---|
| 5,777,508 A * | 7/1998 | Sawanobori | 327/534 |
| 6,856,352 B1 | 2/2005 | Kijima | |

FOREIGN PATENT DOCUMENTS

| | | |
|---|---|---|
| JP | 09-121306 | 5/1997 |
| JP | 10-304134 | 11/1998 |
| JP | 11-112850 | 4/1999 |
| JP | 2000-165758 | 6/2000 |
| JP | 2000-175107 | 6/2000 |
| JP | 2000-209508 | 7/2000 |
| JP | 2000-224495 | 8/2000 |
| JP | 2002-217397 | 8/2002 |

* cited by examiner

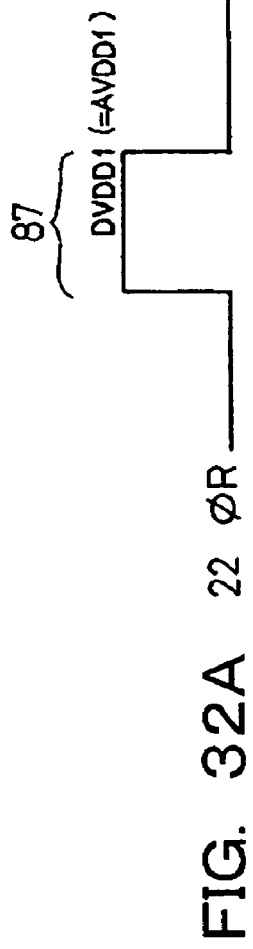
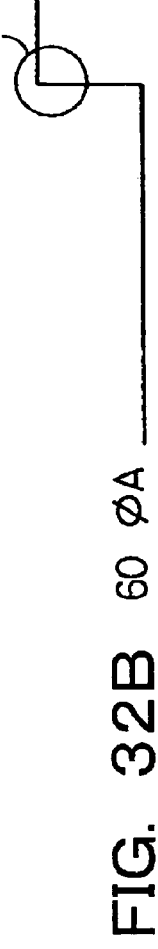
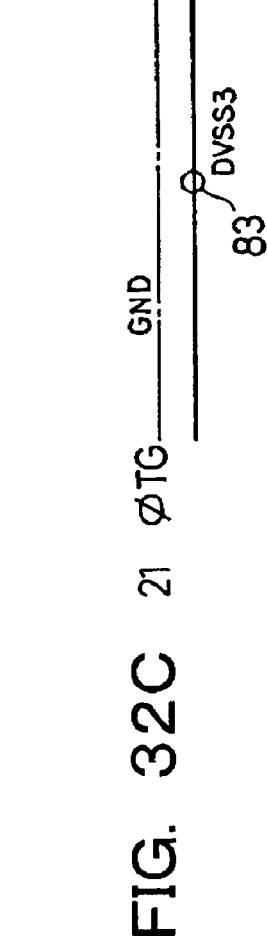
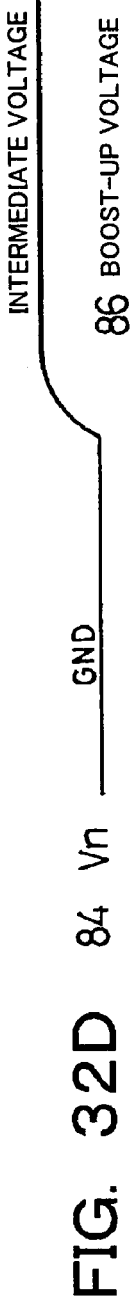
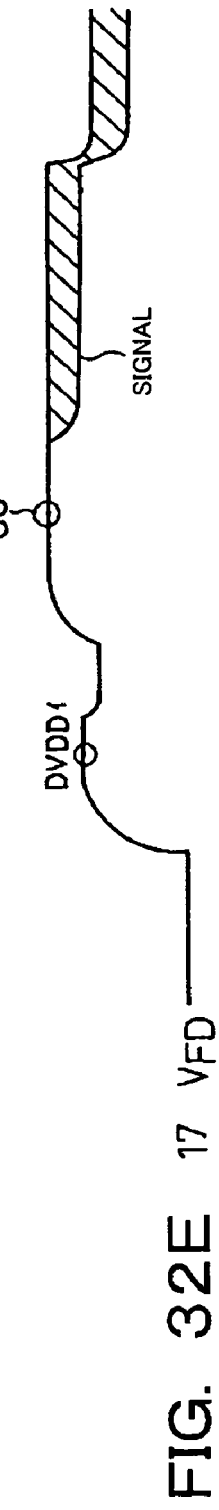
FIG. 32A  22 φR
FIG. 32B  60 φA
FIG. 32C  21 φTG
FIG. 32D  84 Vn
FIG. 32E  17 VFD

SOLID-STATE IMAGING DEVICE

This application claims priority to Japanese Patent Application Number JP2002-102046, filed Apr. 4, 2002 which is incorporated herein by reference.

TECHNICAL FIELD

The present invention relates to an amplification type (CMOS sensor type) solid-state imaging device having a pixel portion comprised of a plurality of unit pixels and a peripheral circuit portion for controlling the pixel portion, more particularly relates to an improvement of a power supply circuit of the same.

BACKGROUND ART

Conventionally, an amplification type (CMOS sensor type) solid-state imaging device for example as shown in FIG. 1 to FIG. 7 has been known. Below, an explanation will be given of the configuration and operation of the conventional example using these drawings.

FIG. 1 is a schematic plan view of an example of the configuration of the conventional solid-state imaging device.

This solid-state imaging device is comprised of a semiconductor chip 1 on which a pixel portion 2 having a large number of unit pixels arranged in a two-dimensional array, a timing generator portion 3 for generating various types of timing signals, an output column portion 4 such as a column CDS for performing correlated double sampling (CDS) for each pixel column (column) of the unit pixels or a column AD for performing A/D conversion, a horizontal drive portion 5 for selecting and driving this output column portion 4 in a horizontal direction, a vertical drive portion 6 for selecting and driving each pixel row, a signal processing portion (DSP) 7 for performing signal processing with respect to pixel signals read out from the pixel portion 2, etc. formed thereon.

This solid-state imaging device is driven by two power supply systems of a first power supply system (hereinafter, referred to as a "digital power supply" for convenience) and a second power supply system (hereinafter, referred to as an "analog power supply" for convenience) as the power supply system. The semiconductor chip 1 has a power supply terminal 8 supplied with a digital power supply voltage DVDD as the first power supply system, a power supply terminal 9 supplied with a digital ground voltage DVSS, a power supply terminal 10 supplied with an analog power supply voltage AVDD as the second power supply system, and a power supply terminal 11 supplied with an analog ground voltage AVSS.

In this way, in the conventional solid-state imaging device, the digital power supply voltage (DVDD) and the analog power supply voltage (AVDD) have the same voltage value (for example 1.8V, 2.5V, or 3.3V), therefore even if a plurality of electrode pads PAD are arranged on the semiconductor chip 1, one type of power supply voltage is supplied from the outside of the chip 1, and it is operating with a single power supply voltage.

FIG. 2 is a cross-sectional view of a stack structure of the pixel portion 2 of the conventional example shown in FIG. 1.

As illustrated, a silicon substrate 12 has a P-well 13 formed on it. This P-well 13 has an element isolation area (LOCOS element isolation in the present example, but sometimes STI etc.) 14, a power supply area (AVDD) 15, a reset gate (Reset) 16 of a reset transistor, a charge detection unit 17 referred to as a floating diffusion (FD) portion, a transfer transistor (transfer gate TG) 18 for transferring a signal charge of a photodiode 23 to the FD portion 17, a P+ type light receiving layer 19 and an N-type photo-electric conversion layer 20 configuring the photodiode 23, etc. formed on it.

In such a solid-state imaging device, with each succeeding generation of semiconductor process, the used power supply voltage has become smaller, for example, 3.3V in a 0.35 μm process, 2.5V in a 0.25 μm process, and 1.8V in a 0.18 μm process.

On the other hand, the solid-state imaging device is a mixed analog-digital device requiring a circuit portion driven by a second power supply system (hereinafter referred to as an "analog circuit portion") and a circuit portion driven by the first power supply system (hereinafter referred to as a "digital circuit portion"). Accordingly, the above digital circuit portion operates even if the power supply voltage is lowered. However, a reduction of voltage of the analog circuit portion is difficult.

Especially, for the pixel portion 2 in the analog circuit portion, the signal charge (Qsig) must be completely transferred from the photodiode 23 to the charge detection unit 17, so reduction of the voltage is difficult.

FIG. 3 to FIG. 7 are explanatory views of potential levels corresponding to the cross-sectional view shown in FIG. 2, wherein the ordinates correspond to a potential level PTN (V), and the abscissas correspond to a location for forming each element on the substrate surface of FIG. 2.

Below, an explanation will be given of a conventional read operation of the signal charge.

First, in FIG. 3, while the signal charge 24 is being stored in the photodiode (PD) 23, a drain terminal 15 of the reset transistor 16 becomes the power supply voltage AVDD1. In the illustrated example, AVDD1=2.5V (indicated by 26 in the figure). At this time, the gate voltage ($\Phi$TG) of the transfer gate 18 is 0V.

Further, the potential level ($\Phi$R) when the reset transistor 16 is "OFF" is for example about 1V (indicated by 27 in the figure). This reset transistor 16 becomes a deep depletion type transistor.

Next, as shown in FIG. 4, the gate of the reset transistor 16 is made the "ON" state. That is, $\Phi$R=2.5V. Then, the potential under the gate of the reset transistor 16 is deeply reset (reset to 3V in the illustrated example) (indicated by 28 in the figure), and the FD potential becomes the same potential (indicated by 26 in the figure) as the power supply voltage 15 (AVDD1=2.5V). That is, the FD potential is reset to the power supply voltage by using the deep depletion type transistor for the reset transistor 16.

Next, FIG. 5 shows the potential when making the reset transistor 16 the "OFF" state, and the FD potential is the same as the potential of AVDD1 as it is. The FD potential actually becomes slightly smaller than AVDD1=2.5V due to a parasitic capacitance with the gate of the reset transistor 16 (indicated by 25 in the figure).

Further, FIG. 6 shows the potential when reading. By applying an "ON" voltage to the transfer gate 18, the signal charge (Qsig) 24 is read out to the FD portion 17.

Here, most of the signal charge (Qsig1) of the signal charge (Qsig) 24 is read out to the FD portion 17, but part of the signal charge (Qsig2) 29 remains in the photodiode 23.

These remaining signal charge becomes a residual image and causes the image characteristics to deteriorate.

Here, the cause of the occurrence of a residual image is that the voltage applied to the transfer gate 18 is relatively small, so a potential barrier 31 is generated under the gate of the transfer gate 18 and the signal charge of the photodiode 23 cannot be completely read out.

In this way, in the conventional amplification type solid-state imaging device, the smaller the voltage driving the pixel portion, the larger the possibility of the occurrence of a residual image and the greater the deterioration of the image quality.

FIG. 7 shows the potential after making the transfer gate 18 "OFF". As illustrated, the gate voltage ($\Phi$TG) of the transfer gate 18 becomes 0V (indicated by 32 in the figure), and a signal charge (Qsig2) 29 remains in the photodiode 23.

As described above, in the conventional amplification type solid-state imaging device, the voltage driving the pixel portion is small, so the signal charge of the photodiode cannot be completely read out. This becomes the cause of occurrence of a residual image.

Further, the problem arises that due to such a background, a large operating margin of the pixel portion cannot be obtained. Further, the problem arises that the structure etc. of the pixel portion becomes restricted, the production process becomes troublesome, and a large power supply voltage becomes necessary.

DISCLOSURE OF THE INVENTION

A first object of the present invention is to provide a solid-state imaging device able to use a plurality of power supply voltages to enlarge an operating margin of the pixel portion by and achieve complete transfer of the signal charge.

A second object of the present invention is to provide a solid-state imaging device able to realize a reduction of the number of masks in the production process and a shortening of the process steps.

To attain the above objects, a first aspect of the present invention is a solid-state imaging device having a pixel portion comprised of a plurality of unit pixels and a peripheral circuit portion for controlling the pixel portion, wherein the peripheral circuit operates supplied with a first power supply voltage of a first power supply system and the pixel portion operates supplied with a second power supply voltage having a value different from that of the first power supply voltage of the second power supply system, comprising a first power supply inputting means for receiving as input the first power supply voltage of the first power supply system from the outside and a second power supply inputting means for receiving as input the second power supply voltage of the second power supply system from the outside and supplying the same to the pixel portion.

Further, a second aspect of the present invention is a solid-state imaging device having a pixel portion comprised of a plurality of unit pixels and a peripheral circuit portion for controlling the pixel portion, wherein the peripheral circuit operates supplied with a first power supply voltage and the pixel portion operates supplied with a second power supply voltage having a value different from that of the first power supply voltage, comprising a power supply inputting means for receiving as input a power supply voltage of a single level from the outside and a level shifting means for converting the level of the power supply voltage received as input by the power supply inputting means to the first power supply voltage and/or second power supply voltage, wherein the first power supply voltage generated by the level shifting means is selectively supplied to the peripheral circuit portion, and the generated second power supply voltage is selectively supplied to the pixel portion.

In the solid-state imaging device of the present invention, since a plurality of different power supply voltages are input from the outside, and the plurality of power supply voltages are selectively supplied to the pixel portion and the peripheral circuit portion, by using the plurality of power supply voltages, setting the optimum power consumption in each portion becomes possible. Especially, the second power supply voltage required for the pixel portion can be effectively set.

Accordingly, the operating margin of each portion is enlarged, the power consumption of the circuit portion including the pixel portion can be reduced, and further it becomes possible to achieve complete transfer of the signal charge in the pixel portion.

Further, change of the threshold value Vth of the transistor, which is usually selectively set at the ion implantation mask, becomes unnecessary, so the number of masks at the time of the ion implantation work can be greatly reduced, and shortening of the process steps can be realized.

Further, in the solid-state imaging device of the present invention, a plurality of different power supply voltages are generated from the power supply voltage from the outside by using the level shifting means, and the plurality of different power supply voltages are selectively supplied to the pixel portion and the peripheral circuit portion, therefore by using the plurality of power supply voltages, setting the optimum power consumption for each portion becomes possible. Especially the second power supply voltage required for the pixel portion can be effectively set.

Accordingly, the operating margin of each portion is enlarged, the power consumption of the circuit portion including the pixel portion can be reduced, and further it becomes possible to achieve a complete transfer of the signal charges in the pixel portion.

Further, change of the threshold value Vth of the transistor, which is usually selectively set at the ion implantation mask, becomes unnecessary, so the number of masks at the ion implantation work can be greatly reduced, and shortening of the process steps can be realized.

BRIEF DESCRIPTION OF THE INVENTION

FIGS. 32A to 32E are timing charts of operation timings of the embodiment shown in FIG. 31.

BEST MODE FOR WORKING THE INVENTION

Below, an explanation will be given of embodiments of a solid-state imaging device according to the present invention.

The solid-state imaging device according to the embodiment of the present invention is for solving the problems of a residual image etc. by supplying power supply voltages of a plurality of levels from the outside of the semiconductor chip or by providing a boosting means in the semiconductor chip and thereby applying a high voltage to the pixel portion, applying a low voltage to the peripheral circuit portion, and resetting the FD portion with a high voltage so as to enlarge the operation dynamic range of the FD portion.

Figure 1:
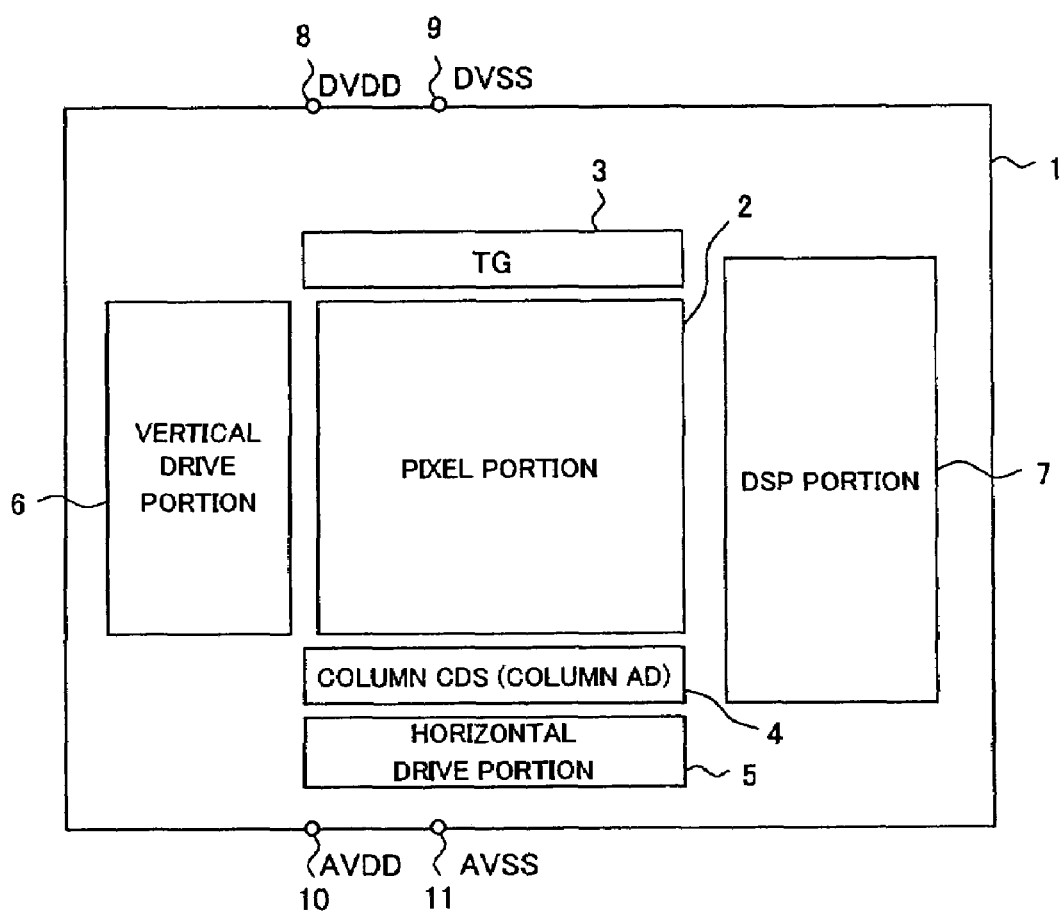
FIG. 1 is a schematic plan view of an example of the configuration of a conventional amplification type solid-state imaging device.
Figure 2:
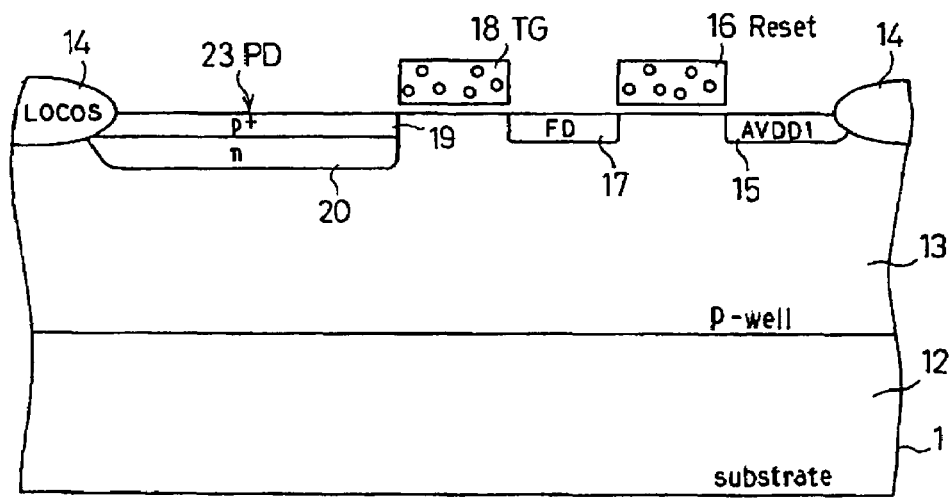
FIG. 2 is a cross-sectional view of a stack structure of a pixel portion in the conventional example shown in FIG. 1.
Figure 3:
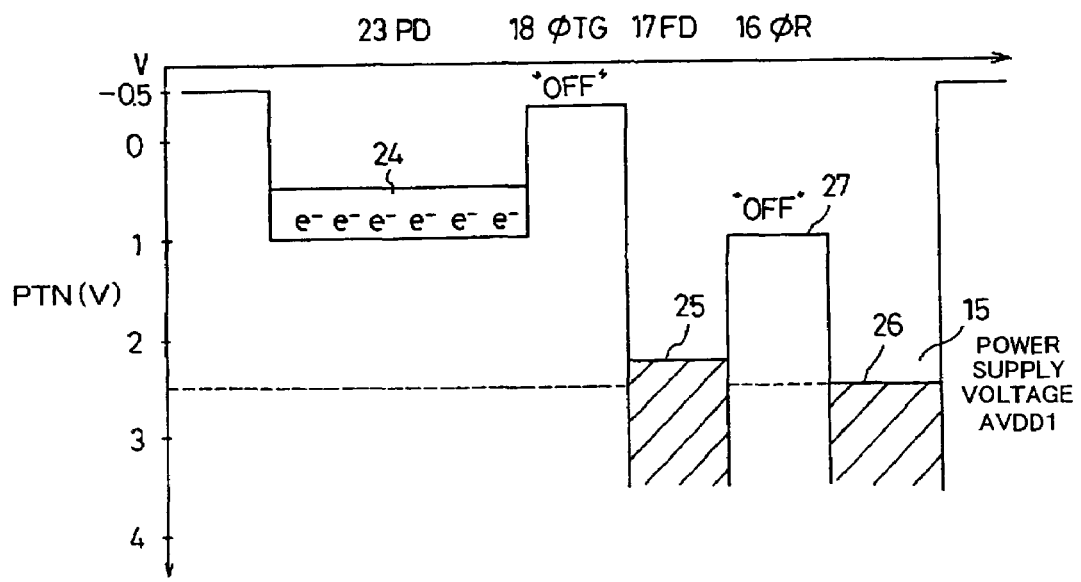
FIG. 3 is an explanatory view of a transition of a potential level of the conventional example shown in FIG. 1.
Figure 8:
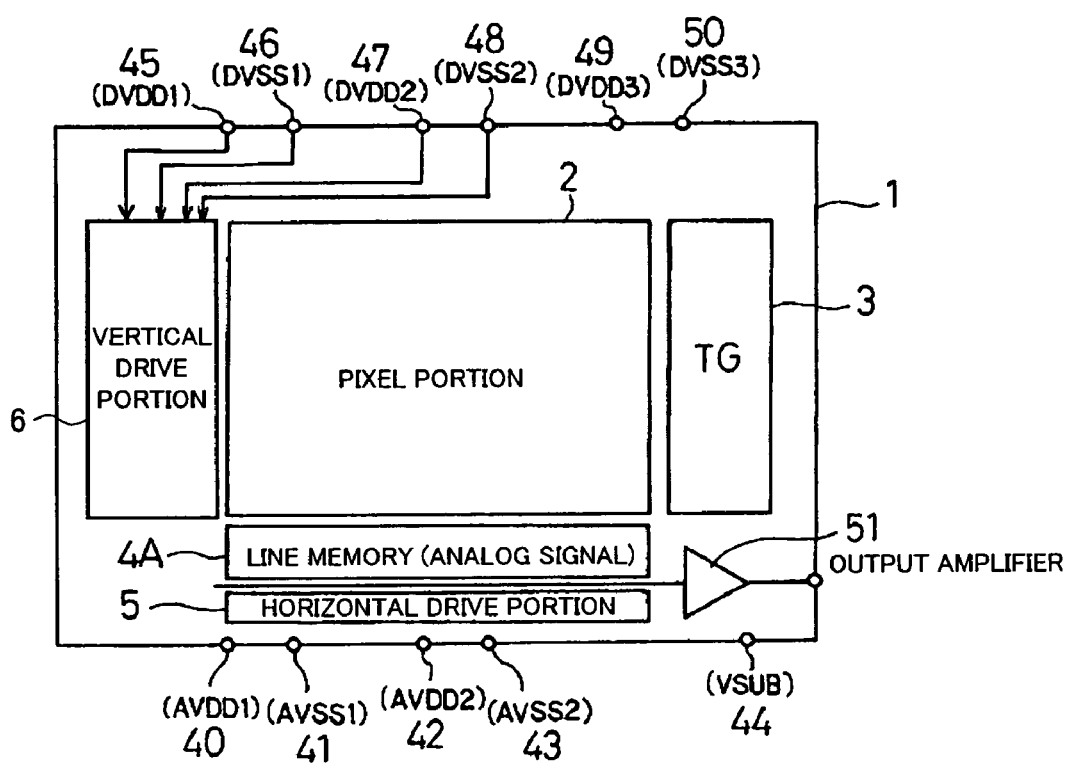
FIG. 8 is a schematic plan view of an example of the configuration of an amplification type solid-state imaging device according to a first embodiment of the present invention.

FIG. 8 is a schematic plan view of an example of the configuration of the amplification type solid-state imaging device according to a first embodiment of the present invention. Note that components having common functions with those of the circuits shown in FIG. 1 will be explained assigned the same notations for convenience.

This solid-state imaging device is an example of a configuration outputting an imaging signal by an analog signal and comprises a semiconductor chip 1 on which a pixel portion 2 having a large number of unit pixels arranged in a two-dimensional array, a timing generator portion 3 for generating various types of timing signals, a line memory portion (column area) 4A for storing analog pixel signals of each pixel row from the pixel portion 2, a horizontal drive portion 5 for selecting and driving the line memory portion 4A in the horizontal direction, a vertical drive portion 6 for selecting and driving each pixel row, and an output amplifier portion 51 etc. for performing predetermined signal processing with respect to the pixel signals read out from the pixel portion 2 and outputting the same are formed.

Further, this semiconductor chip 1 is supplied with, as the digital power supply system serving as the first power supply system, a first digital power supply voltage (DVDD1) from a power supply terminal 45, a first digital ground voltage (DVSS1) from a power supply terminal 46, a second digital power supply voltage (DVDD2) from a power supply terminal 47, a second digital ground voltage (DVSS2) from a power supply terminal 48, a third digital power supply (DVDD3) from a power supply terminal 49, and a third digital ground voltage (DVSS3) from a power supply terminal 50.

Further, the semiconductor chip 1 is supplied with, as the analog power supply system serving as the second power supply system, a first analog power supply voltage (AVDD1) from a power supply terminal 40, a first analog ground voltage (AVSS1) from a power supply terminal 41, a second analog power supply voltage (AVDD2) from a power supply terminal 42, and a second analog ground voltage (AVSS2) from a power supply terminal 43.

Note that the semiconductor chip 1 is provided with a substrate contact (VSUB) 44.

In such a circuit configuration, the pixel portion 2, the line memory portion 4A, and the output amplifier portion 51 are the analog circuit portions driven by the second power supply system, that is, the analog power supply, while the TG portion 3, the vertical drive portion 6, and the horizontal drive portion 5 are the digital circuit portions driven by the first power supply system, that is, the digital power supply.

In such a solid-state imaging device, along with the successive generations of the semiconductor process, the used power supply voltage becomes smaller. For example, 3.3V in the 0.35 μm process, 2.5V in the 0.25 μm process, and 1.8V in the 0.18 μm process.

In the present embodiment, a plurality of power supplies having different power supply voltage values are supplied from the outside of the semiconductor chip 1.

Namely, in FIG. 8, DVDD1 is not equal to DVDD2. For example when DVDD1=3.3V, DVDD2=2.5V. By supplying such a power supply voltage value from the outside of the solid-state imaging device to the semiconductor chip 1, in particular complete transfer of the signal charge from the photodiode 23 becomes possible.

Further, the analog power supply voltage values AVDD1 and AVDD2 can be used at different voltages also. By setting the power supply of the pixel portion 2 as AVDD1 and setting the power supply of the line memory portion 4A and the output amplifier portion 51 as AVDD2, setting the optimum power consumption for each portion of the circuit becomes possible.

By this, the operating margin of each portion is enlarged, and the power consumption of the analog portion can be reduced.

Figure 9:
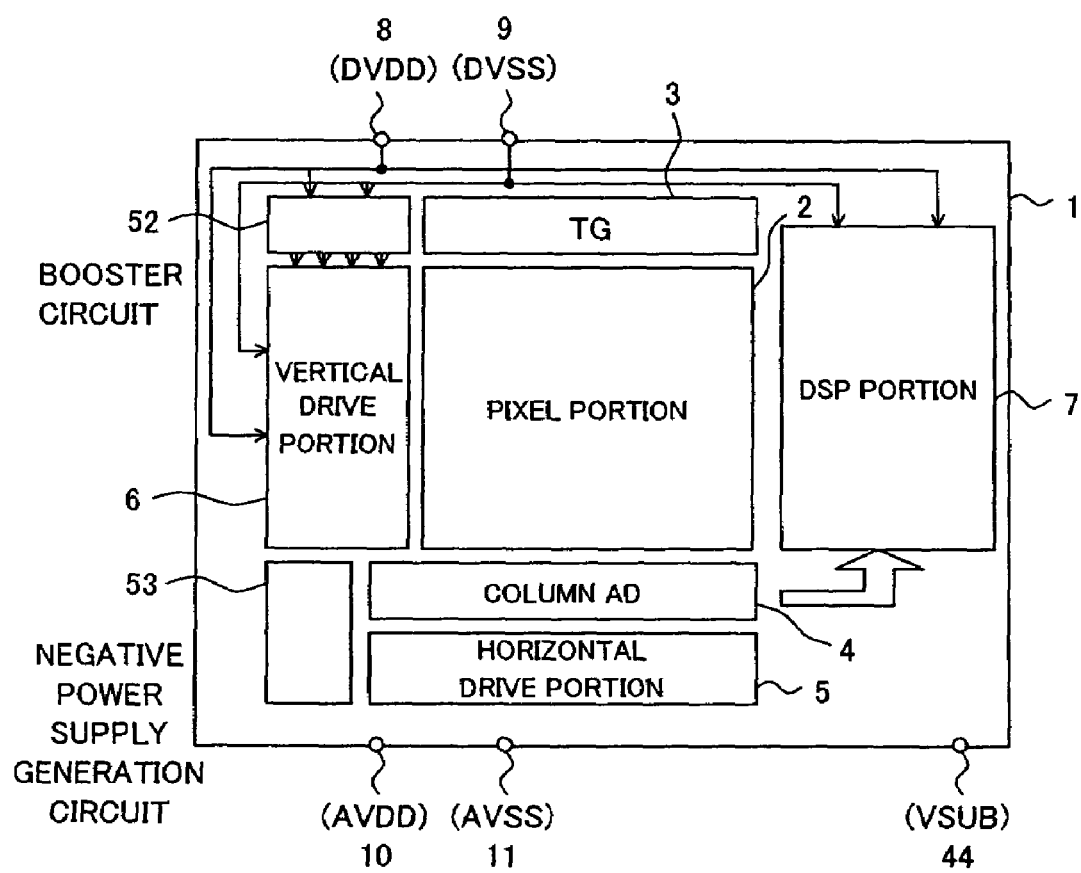
FIG. 9 is a schematic plan view of an example of the configuration of an amplification type solid-state imaging device according to a second embodiment of the present invention.

FIG. 9 is a schematic plan view of an example of the configuration of an amplification type solid-state imaging device according to a second embodiment of the present invention. Note that components having common functions with those of the circuits shown in FIG. 1 will be explained assigned the same notations for convenience.

This solid-state imaging device is an example of a configuration for converting an imaging signal to a digital signal, processing that digital signal, and outputting the result and comprises a semiconductor chip 1 on which a pixel portion 2 having a large number of unit pixels arranged in a two-dimensional array, a timing generator portion 3 for generating various types of timing signals, an output column portion (column area) 4 such as a column CDS or column AD, a horizontal drive portion 5 for selecting and driving this output column portion 4 in the horizontal direction, a vertical drive portion 6 for selecting and driving each pixel row, a signal processing portion (DSP) 7 for processing the pixel signals read out from the pixel portion 2, a booster circuit 52 for boosting the analog power supply voltage serving as the second power supply voltage and the digital power supply voltage serving as the first power supply voltage from the outside, and a negative power supply generation circuit 53 etc. for generating a negative power supply by the analog power supply voltage and digital power supply voltage from the outside formed thereon.

This semiconductor chip 1 is supplied with, as the digital power supply system serving as the first power supply system, a digital power supply voltage (DVDD) from a power supply terminal 8 and a digital ground voltage (DVSS) from a power supply terminal 9 and is supplied with, as the analog power supply system serving as the second power supply system, an analog power supply voltage (AVDD) from a power supply terminal 10 and an analog ground voltage (AVSS) from a power supply terminal 11.

Note that the semiconductor chip 1 is provided with a substrate contact (VSUB) 44.

In the present embodiment, both of the digital power supply voltage (DVDD) and the analog power supply voltage (AVDD) 10 have the same power supply voltage value. By boosting the power supply voltages of AVDD=DVDD at the booster circuit 52 and further generating the negative power supply by the negative power supply generation circuit 53, another power supply voltage value is generated inside the semiconductor chip 1.

In this way, even if there is a single power supply voltage value supplied from the outside of the semiconductor chip 1, by generating a plurality of power supply voltages inside the chip, the operating margin of the pixel portion 2 can be greatly enlarged.

Further, as a result of this, change of the threshold value Vth of the transistor, which is usually selectively set at the ion implantation mask, becomes unnecessary, so it becomes possible to greatly reduce the number of masks at the ion implantation work.

Figure 10:
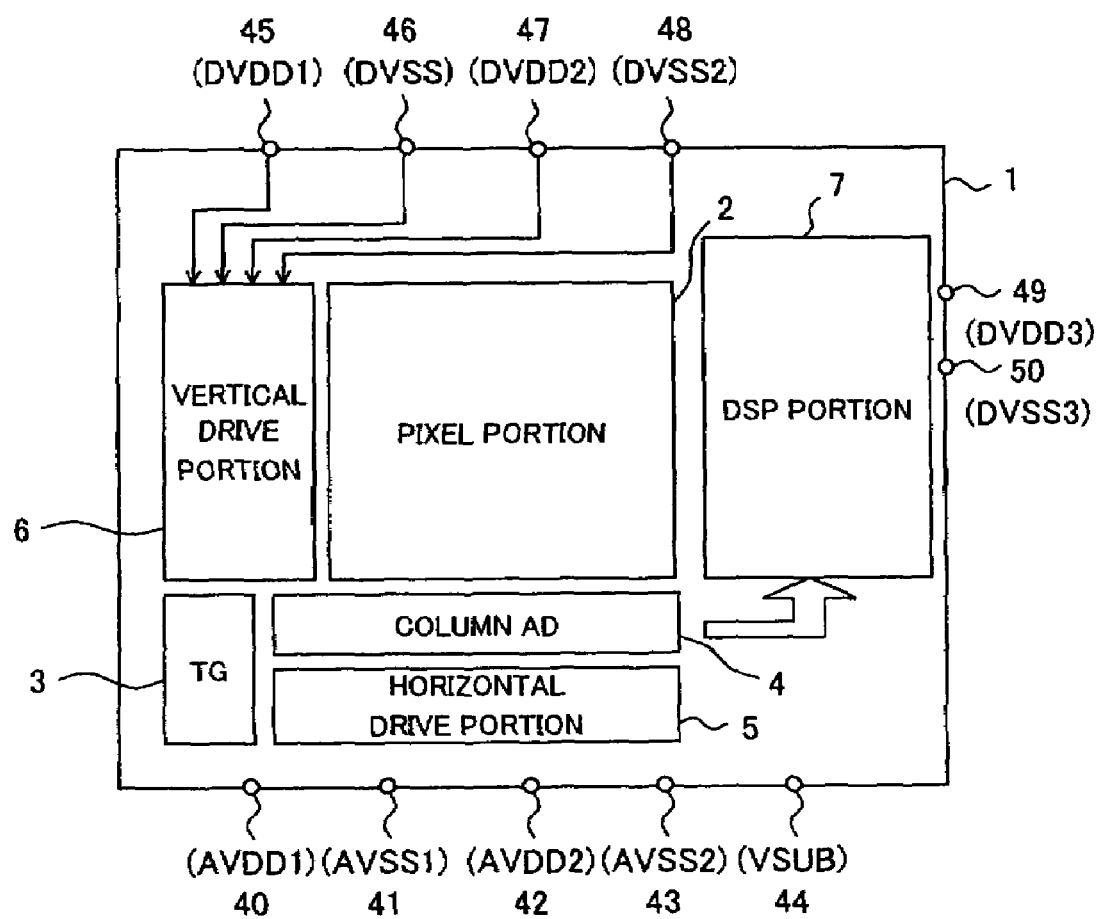
FIG. 10 is a schematic plan view of an example of the configuration of an amplification type solid-state imaging device according to a third embodiment of the present invention.

FIG. 10 is a schematic plan view of an example of the configuration of an amplification type solid-state imaging device according to a third embodiment of the present invention. Note that components having common functions with those of the circuits shown in FIG. 1 will be explained assigned the same notations for convenience.

This solid-state imaging device is an example of a configuration modifying the configuration of the first embodiment shown in FIG. 8 to digital output and further performing digital signal processing and comprises a semiconductor chip 1 on which a pixel portion 2 having a large number of unit pixels arranged in a two-dimensional array, a timing generator portion 3 for generating various types of timing signals, an output column portion (column area) 4 such as a column CDS or column AD, a horizontal drive portion 5 for selecting and driving this output column portion 4 in the horizontal direction, a vertical drive portion 6 for selecting and driving each pixel row, a signal processing portion (DSP) 7 for processing the pixel signals read out from the pixel portion 2, etc. formed thereon.

Further, this semiconductor chip 1 is supplie with, as the digital power supply system serving as the first power supply system, the first digital power supply voltage (DVDD1) from the power supply terminal 45, the first digital ground voltage (DVSS1) from the power supply terminal 46, the second digital power supply voltage (DVDD2) from the power supply terminal 47, the second digital ground voltage (DVSS2) from the power supply terminal 48, the third digital power supply (DVDD3) from the power supply terminal 49, and the third digital ground voltage (DVSS3) from the power supply terminal 50.

Further, the semiconductor chip 1 is supplied with, as the analog power supply system serving as the second power supply system, the first analog power supply voltage (AVDD1) from the power supply terminal 40, the first analog ground voltage (AVSS1) from the power supply terminal 41, the second analog power supply voltage (AVDD2) from the power supply terminal 42, and the second analog ground voltage (AVSS2) from the power supply terminal 43.

Note that the semiconductor chip 1 is provided with a subtrate contact (VSUB) 44.

Also, in this third embodiment, by supplying a plurality of power supplies having different power supply voltage values from the outside of the semiconductor chip 1, the operating margin of the circuit is enlarged and further it becomes possible to optimize the power consumption of each circuit block.

Next, an explanation will be given of an example of the configurations of the unit pixel of the pixel portion 2 explained above and the vertical drive portion 6 for driving the same as a fourth embodiment of the present invention.

Figure 11:
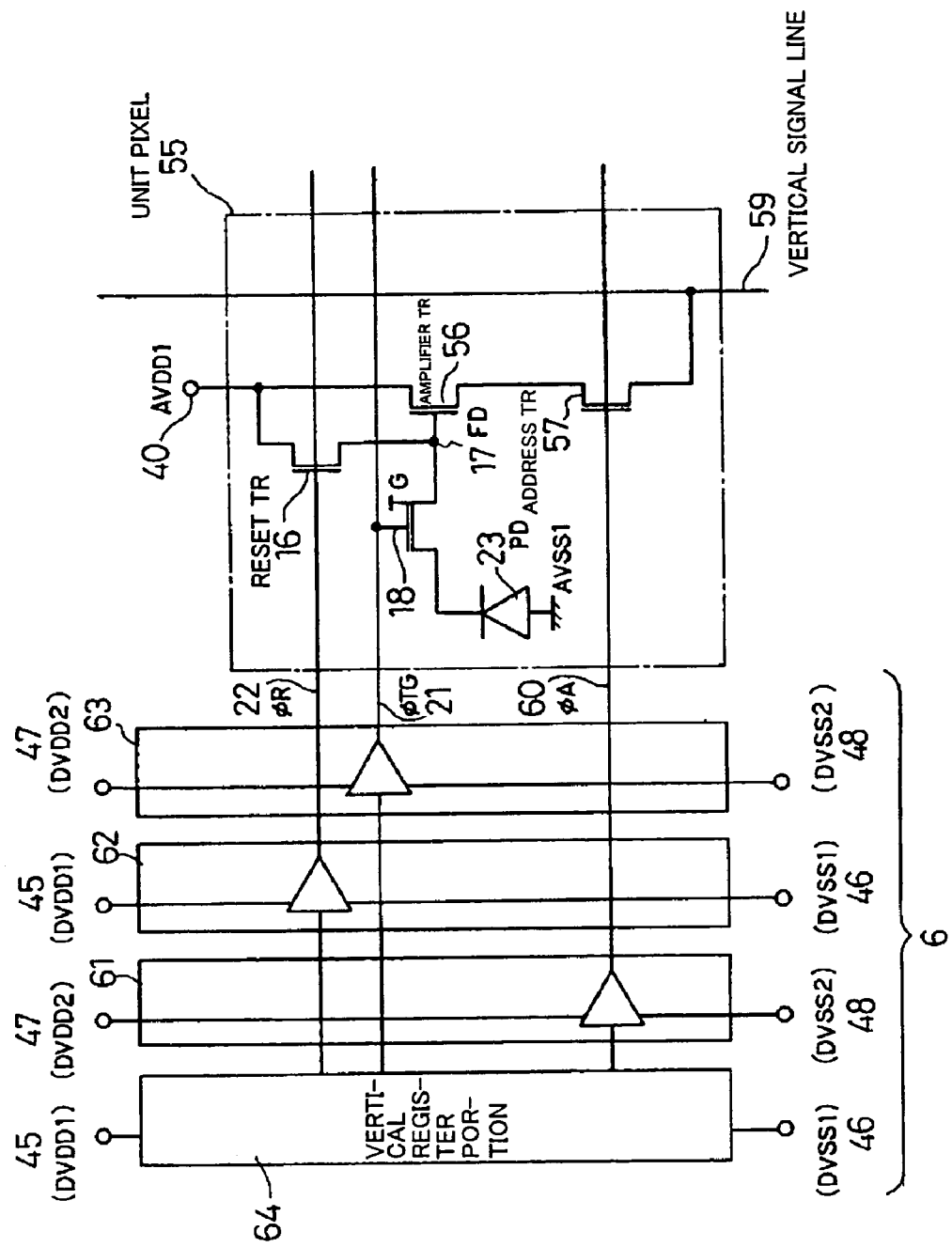
FIG. 11 is a block diagram of an example of configurations of a unit pixel and a vertical drive portion in a fourth embodiment of the present invention.

FIG. 11 is a block diagram of an example of the configuration of the unit pixel and the vertical drive portion in the fourth embodiment of the present invention.

As mentioned above, the pixel portion 2 is provided with a large number of unit pixels 55 in a two-dimensional array. Each unit pixel 55 in the present example is configured by a photodiode 23, a transfer transistor (transfer gate TG) 18, a charge detection unit (FD portion) 17, an amplifier transistor 56, an analog power supply terminal (AVDD1) 40, a selection (address) transistor 57, a vertical signal line 59, etc.

Further, the vertical drive portion 6 for driving the pixel portion 2 is configured by a vertical register portion 64 for sequentially selecting pixel rows in the vertical direction and level shifter circuits 61, 62, 63. etc. for shifting the levels of the selection signals by this vertical register portion 64 by the power supply voltage.

The level shifter circuits 61, 62, and 63 control the gate voltages of the selection transistor 57, the reset transistor 16, and the transfer gate 18 and apply a control pulse ΦR (for reset), ΦTG (for transfer gate), and ΦA (for selection) to the transistors of the unit pixel 55.

In the example of FIG. 11, a voltage larger than the power supply voltage DVDD1 must be applied to the transfer gate 18 and the selection transistor 57, so a power supply voltage DVDD2 larger than the DVDD1 is supplied by the level shifter circuits 61 and 63.

In this way, the configuration of the vertical drive portion 6 becomes complex, but a voltage difference between the power supply voltage and the GND voltage is big, so the operating margin of the pixel can be made large.

As a result, change of the threshold value Vth of the transistor, which is usually selectively set at the ion implantation mask, becomes unnecessary, so it becomes possible to greatly reduce the number of masks at the ion implantation work.

Figure 12:
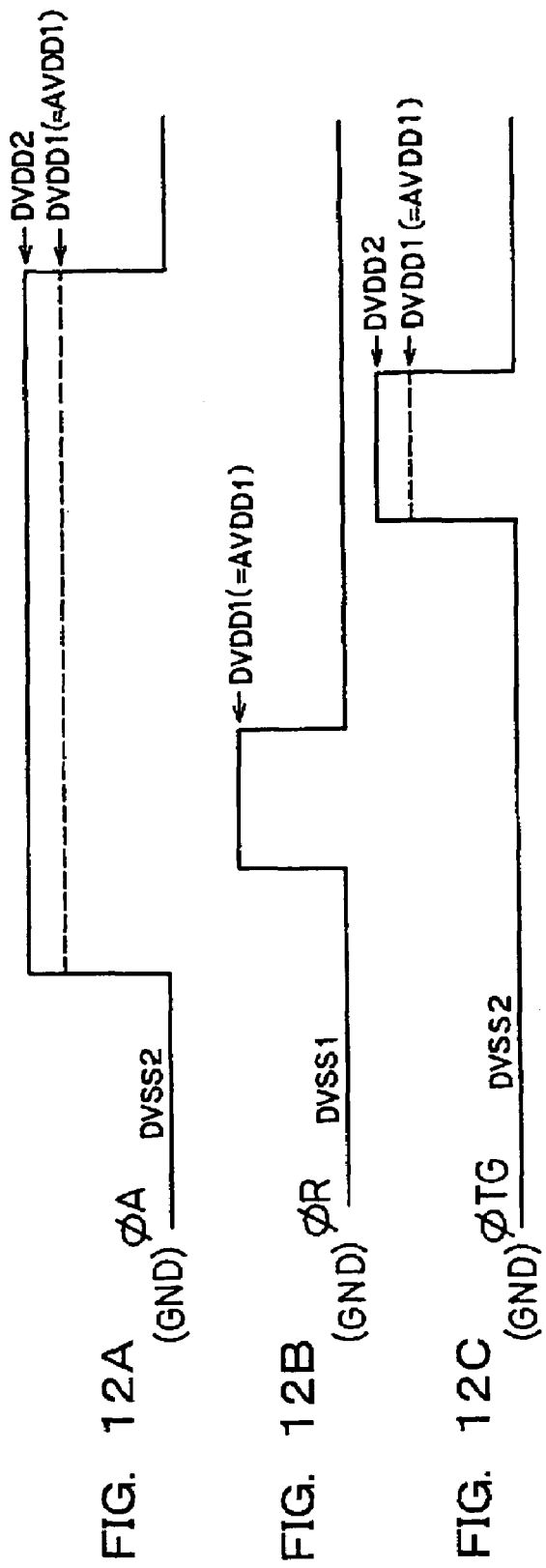
FIGS. 12A to 12C are timing charts of operation timings of the embodiment shown in FIG. 11.

FIGS. 12A to 12C are timing charts of the operation timings of the control pulses shown in FIG. 11. The pulse ΦA applied to the selection transistor 57 is made the voltage of DVDD2 (DVDD2>DVDD1). By doing this, the channel voltage of the selection transistor 57 can be made larger than the power supply voltage DVDD1. Thereafter, a pulse ΦR=DVDD1 is applied to the reset transistor 16. By this, the charge detection unit 17 can be reset.

The charge detection unit 17 must be completely reset up to the same potential as that of the power supply voltage AVDD1 of the pixel portion 2, so becomes a threshold voltage which can be completely reset even if ΦR=DVDD1 in this figure (also ΦR can use the DVDD2, but the case not using this was shown in FIGS. 12A to 12C). Thereafter, by applying ΦTG=DVDD2 to the transfer gate 18, the signal charge of the photodiode 23 can be read out to the charge detection unit 17.

Figure 13:
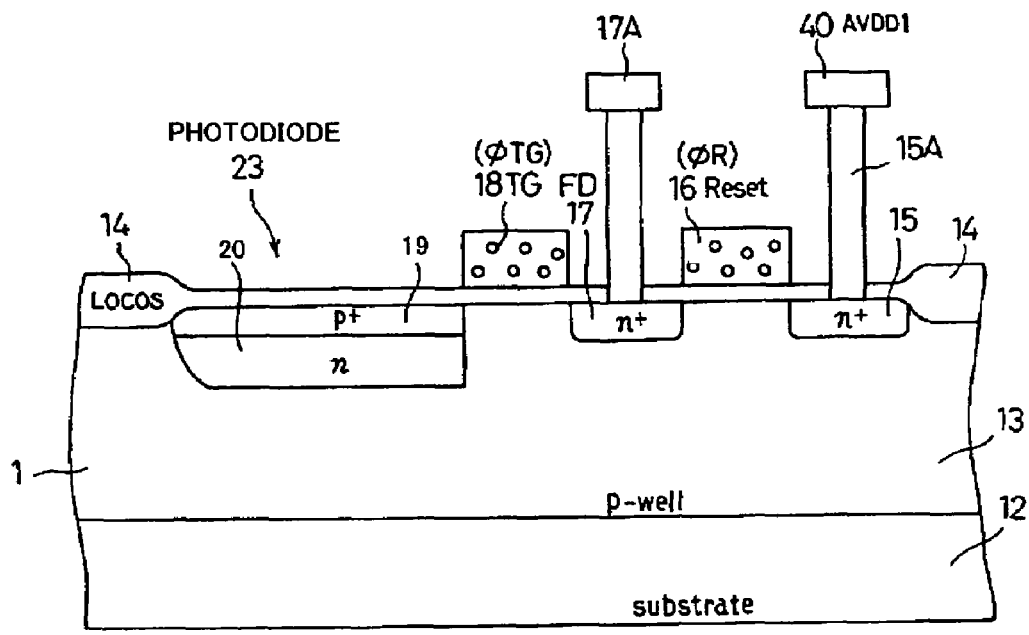
FIG. 13 is a cross-sectional view of a stack structure of the pixel portion of the embodiment shown in FIG. 11.

FIG. 13 is a cross-sectional view of the stack structure of the pixel portion 2 of the embodiment shown in FIG. 11.

As illustrated, the silicon substrate 12 has a P-well 13 formed on it. This P well 13 has an element isolation area (LOCOS element isolation in the present example, but sometimes ST1 etc.) 14, a power supply area (AVDD) 15, a reset gate (Reset) 16 of the reset transistor, a charge detection unit 17, a transfer gate (TG) 18 for transferring the signal charge of the photodiode 23 to the charge detection unit 17, a P+ type light receiving layer 19, and an N-type photo-electric conversion layer 20 etc. forming the photodiode 23 formed on it.

The charge detection unit 17 is connected to the gate of the amplifier transistor 56 via the contact 17A etc., and the power supply area 15 is connected to the first analog power supply terminal (AVDD1) 40 via the contact 15A etc.

Figure 4:
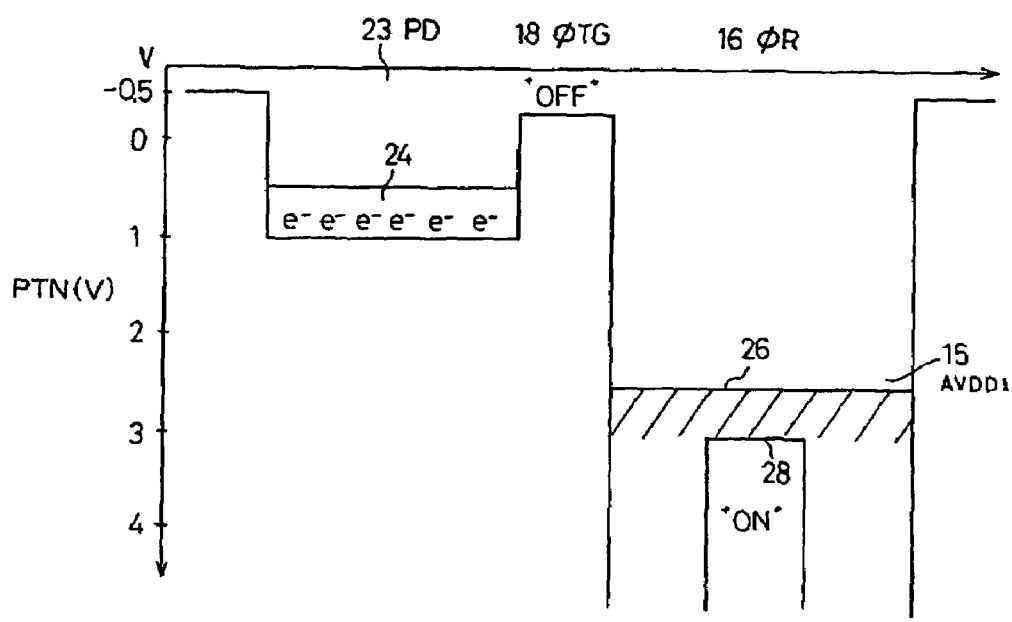
FIG. 4 is an explanatory view of the transition of the potential level of the conventional example shown in FIG. 1.
Figure 5:
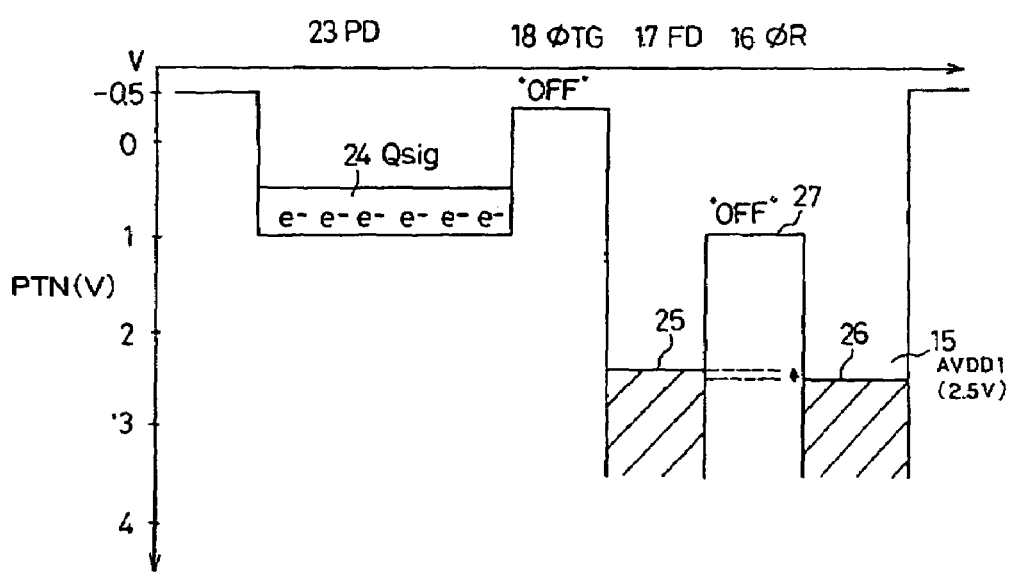
FIG. 5 is an explanatory view of the transition of the potential level of the conventional example shown in FIG. 1.
Figure 6:
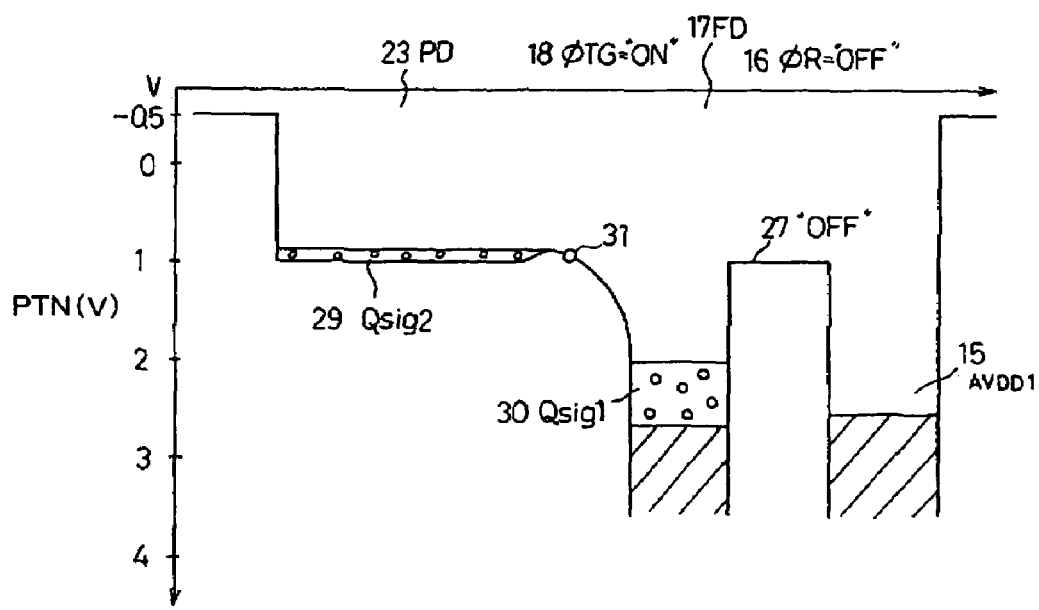
FIG. 6 is an explanatory view of the transition of the potential level of the conventional example shown in FIG. 1.
Figure 7:
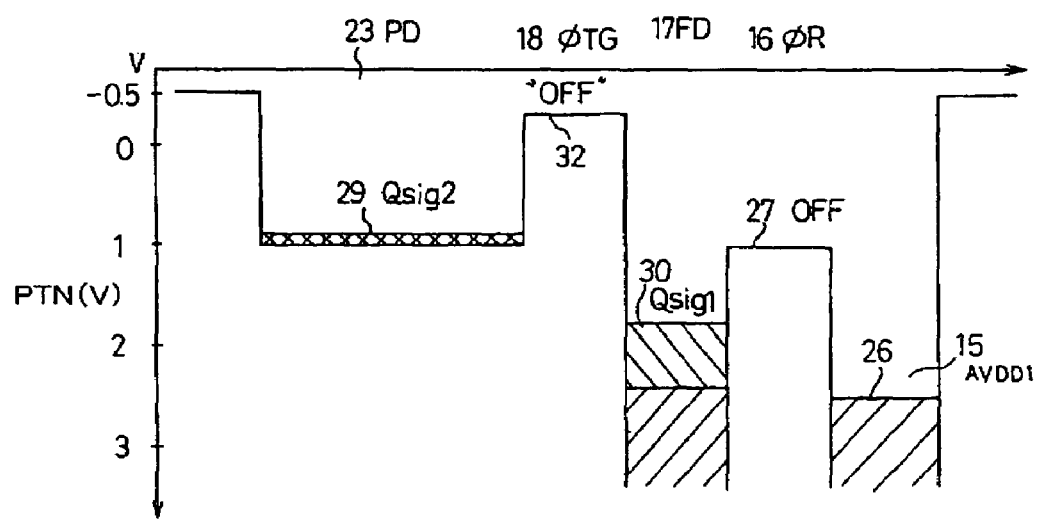
FIG. 7 is an explanatory view of the transition of the potential level of the conventional example shown in FIG. 1.

FIG. 14 to FIG. 18 are explanatory views of the potential levels corresponding to the cross-sectional view shown in FIG. 13, wherein the ordinates correspond to the potential level (V), and the abscissas correspond to the locations for forming the elements on the substrate surface of FIG. 4. Note that components common with those of FIG. 3 to FIG. 7 which have been already explained are assigned the same notations.

First, the power supply voltage (AVDD1) of the pixel portion 2 in the present example is 1.8V in this figure (indicated by 26 in the figure).

Figure 14:
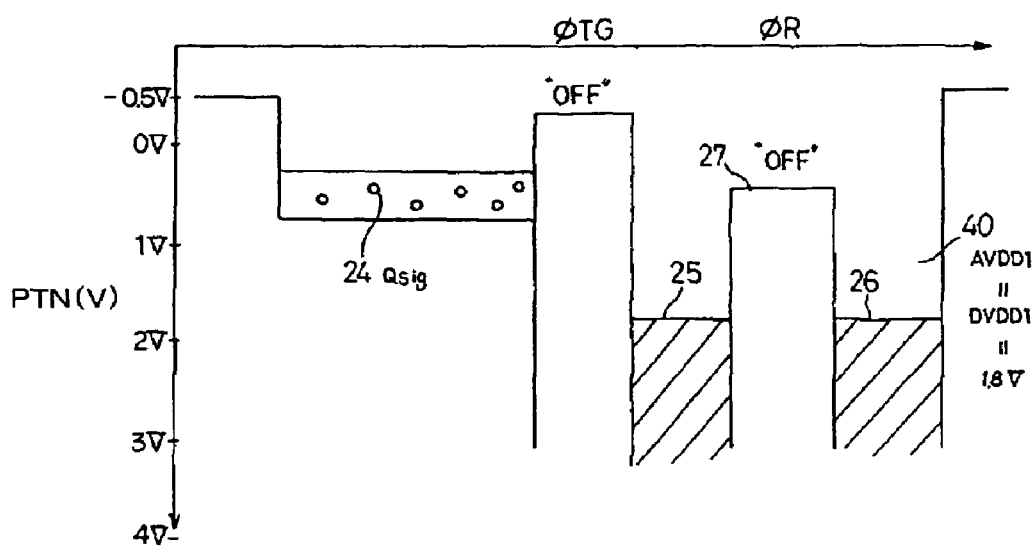
FIG. 14 is an explanatory view of the transition of the potential level of the embodiment shown in FIG. 11.

Further, in FIG. 14, the transfer gate 18 and the reset transistor 16 become ΦTG=ΦR="OFF" state. A signal charge (Qsig) 24 is stored in the area of the photodiode 23.

Figure 15:
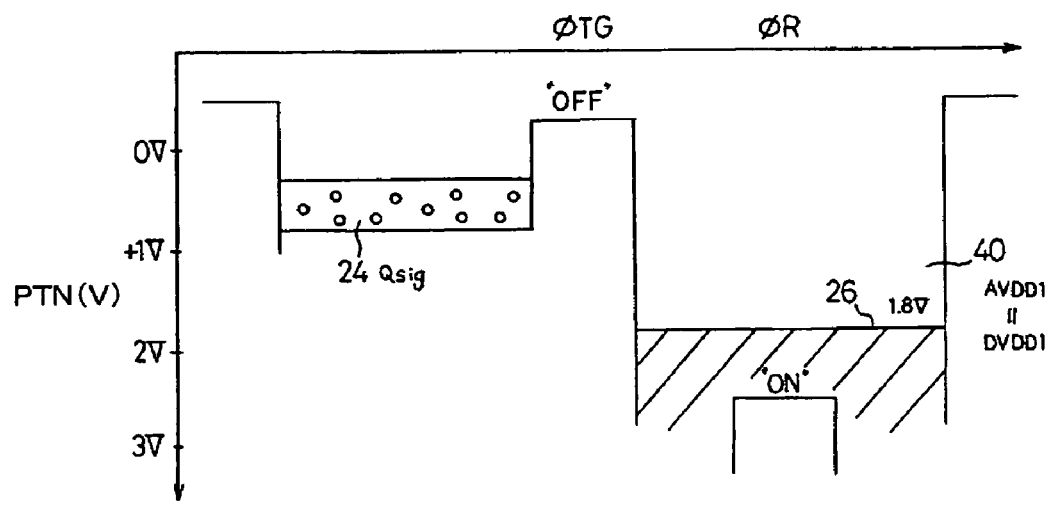
FIG. 15 is an explanatory view of the transition of the potential level of the embodiment shown in FIG. 11.

Next, FIG. 15 shows the potential level in the state where ΦTG="OFF" and ΦR="ON". Here, the charge detection unit (FD portion) 17 is set at 1.8V by the power supply voltage AVDD1 of the pixel portion.

Figure 16:
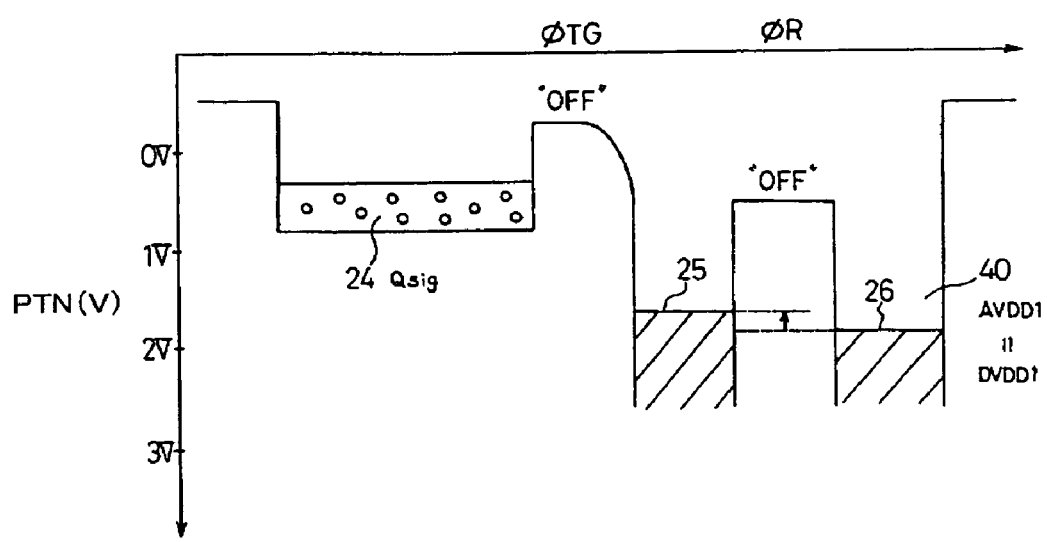
FIG. 16 is an explanatory view of the transition of the potential level of the embodiment shown in FIG. 11.

Next, FIG. 16 shows the potential level in the state where ΦTG="OFF" and ΦR="OFF". Here, by turning OFF the reset transistor 16, the potential of the charge detection unit 17 fluctuates. This is the influence of the parasitic capacitance between the gate of the reset transistor 16 and the charge detection unit 17.

Figure 17:
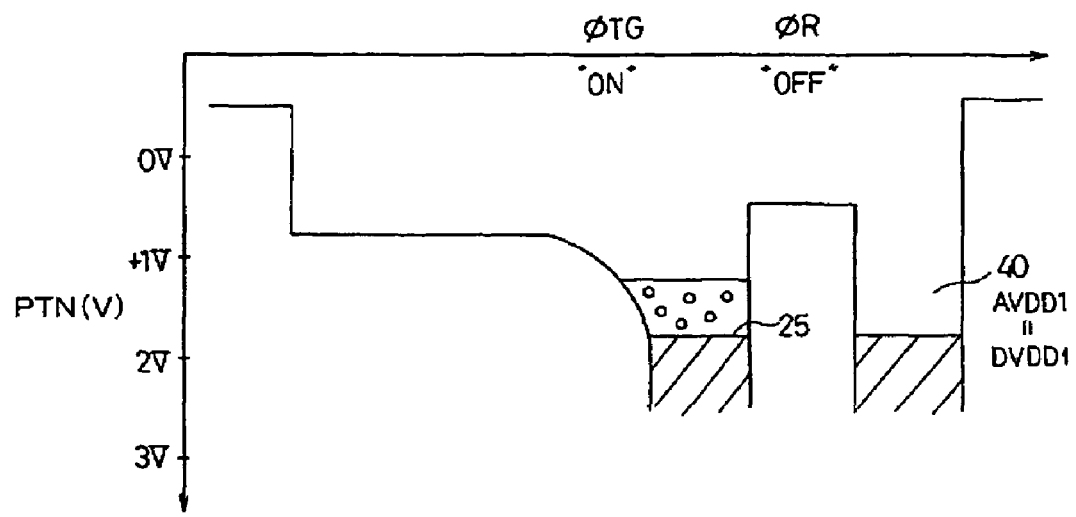
FIG. 17 is an explanatory view of the transition of the potential level of the embodiment shown in FIG. 11.

Next, FIG. 17 shows the potential level in the state where ΦTG="ON" and ΦR="OFF". The voltage of ΦTG="ON"=DVDD2 is larger than DVDD1. In this case, DVDD2 becomes equal to 2.5V (>DVDD1).

Accordingly, the voltage applied to the transfer gate 18 is large, so it becomes possible to completely read out the signal charge (Qsig) 24 of the photodiode 23 to the charge detection unit 17.

Figure 18:
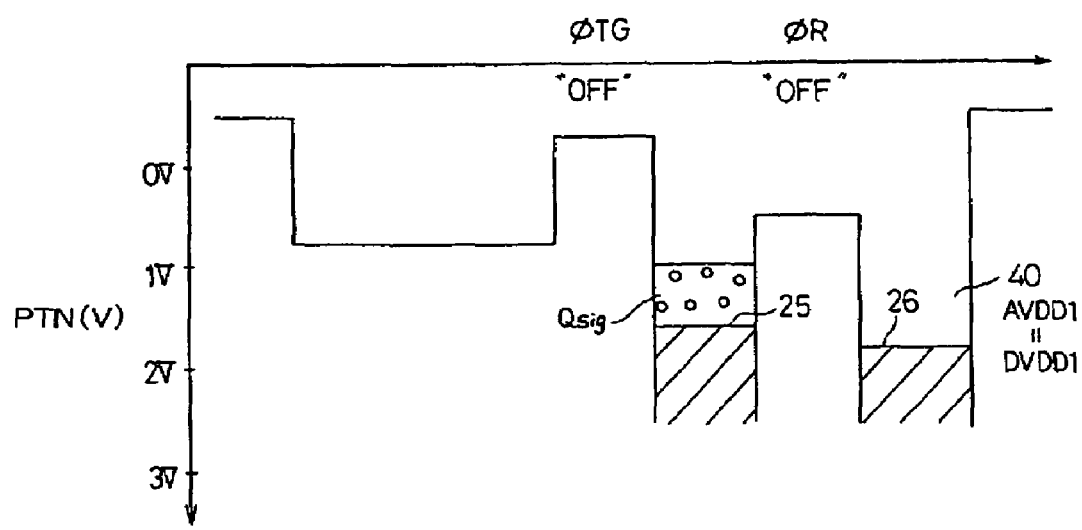
FIG. 18 is an explanatory view of the transition of the potential level of the embodiment shown in FIG. 11.

Next, FIG. 18 shows the potential level in the state where ΦTG="OFF" and ΦR="OFF".

As described above, in the present embodiment, by using a voltage larger than the power supply voltage AVDD1=DVDD1 of the pixel portion 2, for example ΦTG="ON"=DVDD2, it becomes possible to completely transfer the signal charge of the photodiode 23.

Figure 19:
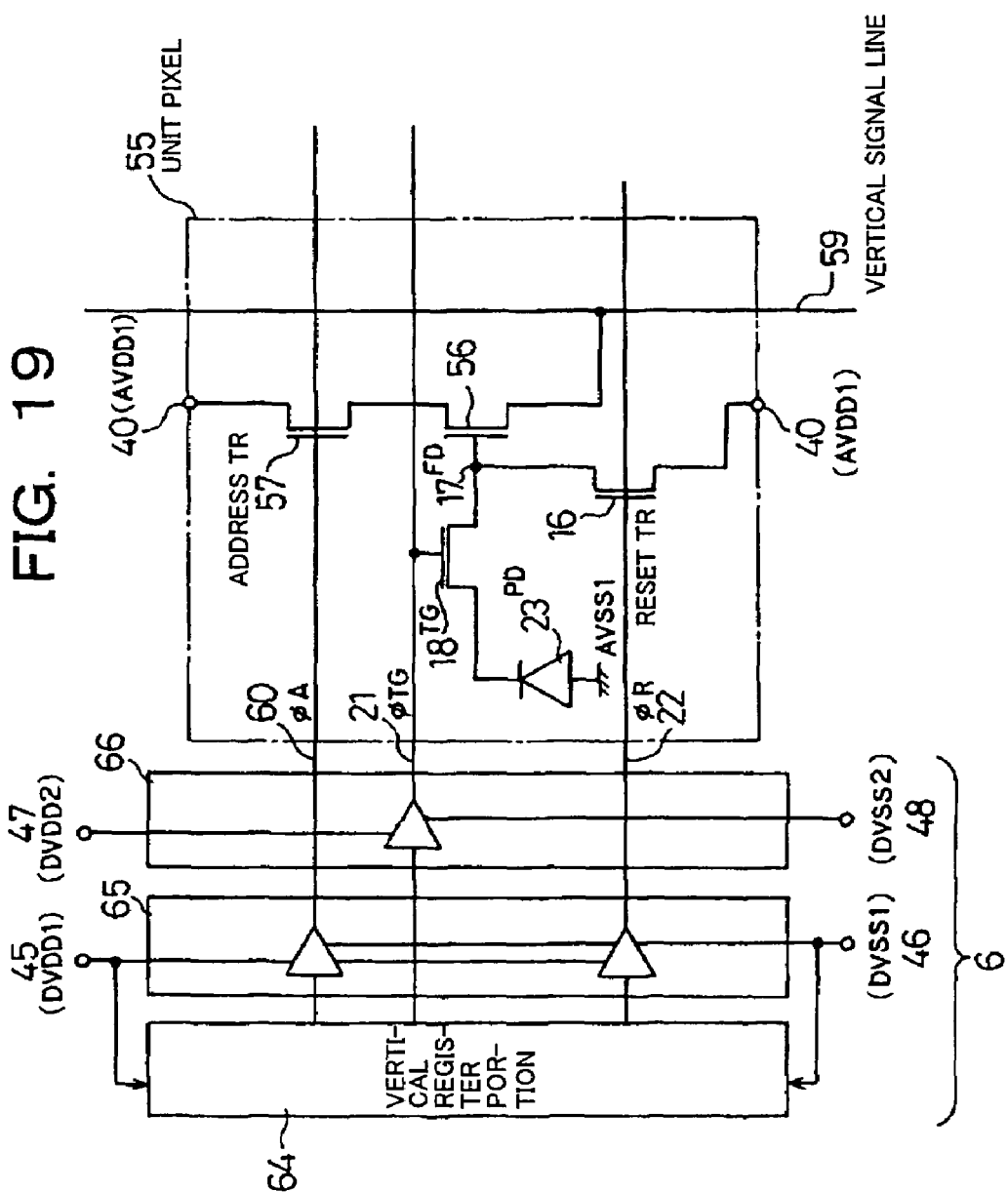
FIG. 19 is a block diagram of an example of the configurations of the unit pixel and the vertical drive portion in a fifth embodiment of the present invention.

FIG. 19 is a block diagram of an example of the configurations of the unit pixel and the vertical drive portion in a fifth embodiment of the present invention.

This fifth embodiment has a configuration supplying power supply voltages of a plurality of levels from the outside and has a pixel configuration different from that of the fourth embodiment of FIG. 11 explained above.

The components of each unit pixel 55 are, in the same way as the fourth embodiment, the photodiode 23, the transfer transistor 18, the amplifier transistor 56, the selection transistor 57, the reset transistor 16, etc., but the connection configuration is different.

Further, the vertical drive portion 6 is comprised of a vertical register portion 64, two level shifter circuits 65 and 66, etc.

Figure 20:
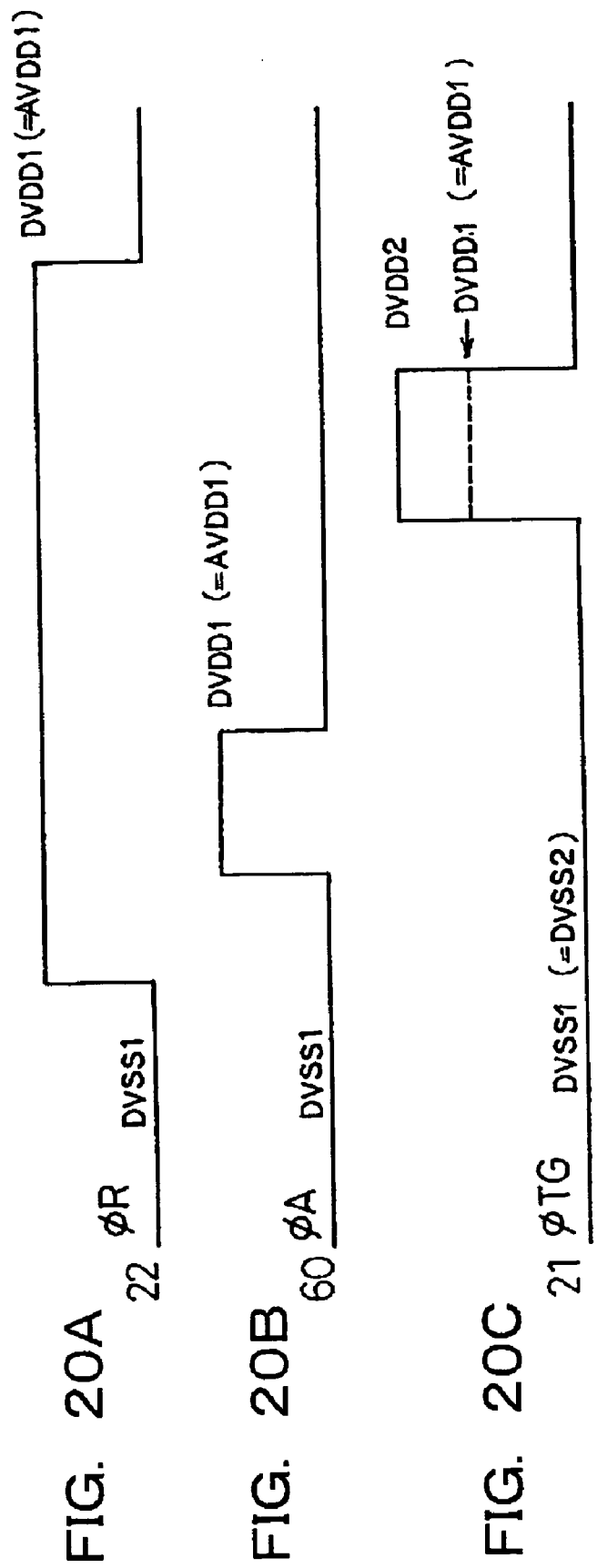
FIGS. 20A to 20C are timing charts of operation timings of the embodiment shown in FIG. 19.

FIGS. 20A to 20C are timing charts of the operation timings of control pulses shown in FIG. 19.

In order to activate the selection transistor 57, ΦR="ON"=DVDD1 (=AVDD1) is applied.

By this, the selection transistor is activated, and its pixel is selected (in actuality, a plurality of pixels are arranged in the row direction, so all pixels in the row direction are activated).

Thereafter, the reset transistor 16 is activated. That is, ΦR=DVDD1 is applied, and the charge detection unit 17 is reset to the power supply voltage (AVDD1) of the pixel portion 2.

Next, a pulse is applied to the transfer gate 18. Namely, by setting ΦTG="ON"=DVDD2>DVDD1, it becomes possible to completely transfer the signal of the photodiode 23 to the charge detection unit 17.

Further, by using a plurality of power supply voltages, the number of types of the threshold values Vth of the transistors used in the pixel portion 2 can be reduced to one, and reduction of the number of masks becomes possible.

Figure 21:
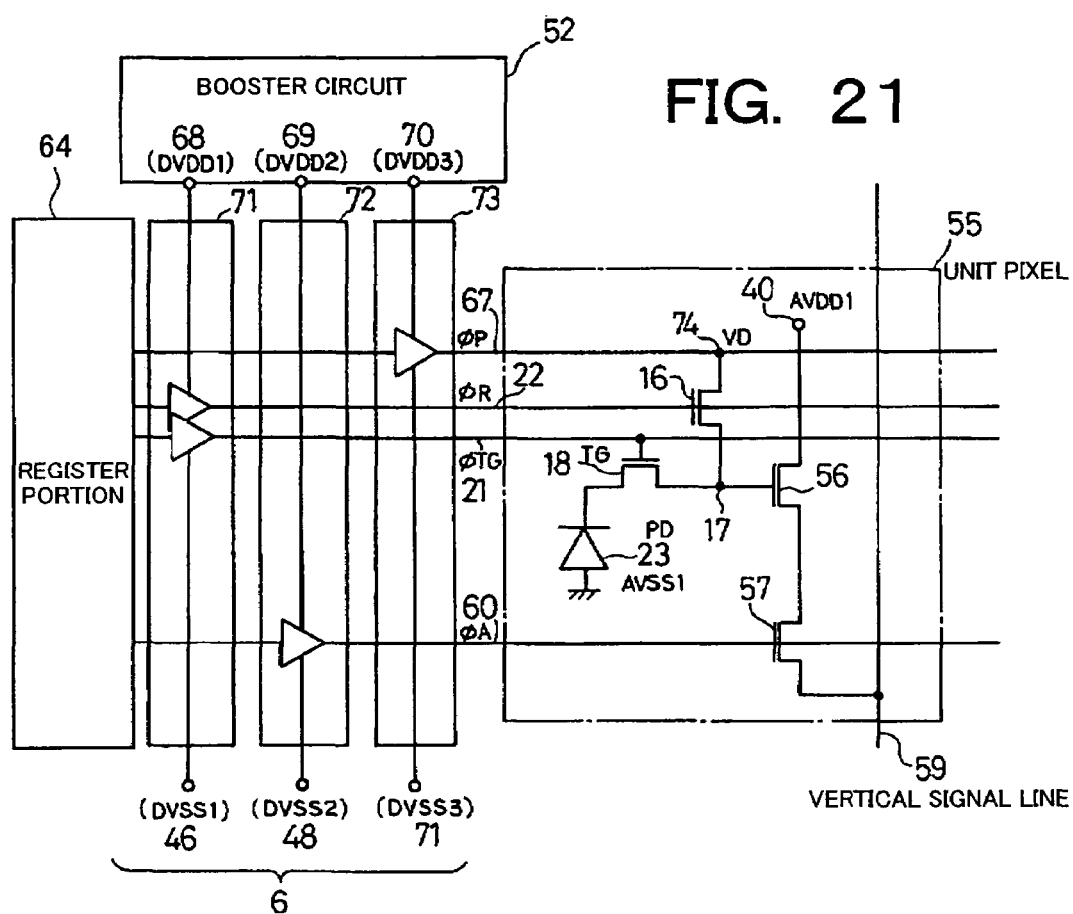
FIG. 21 is a block diagram of an example of the configurations of the unit pixel and the vertical drive portion in a sixth embodiment of the present invention.

FIG. 21 is a block diagram of an example of the configurations of the unit pixel and the vertical drive portion in a sixth embodiment of the present invention.

This sixth embodiment has a configuration supplying a single power supply voltage from the outside in the same way as the second embodiment of FIG. 9 mentioned above and shows a case of the configuration of forming the booster circuit 52 inside the chip and generating a plurality of power supply voltages.

Then, the unit pixel 55 is comprised of a photodiode 23, a transfer gate 18, a charge detection unit 17, an amplifier transistor 56, a reset transistor 16, a selection transistor 57, etc. Further, the vertical drive portion 6 is configured by a vertical register portion 64, level shifter circuits 71, 72, and 73, and a booster circuit 52 for supplying power supplies to the level shifter circuits 71, 72, and 73.

Further, four control signals of a Φp pulse 67, ΦR pulse 22, ΦTG pulse 21, and ΦA pulse 60 are supplied from the level shifter circuits 71, 72, and 73 for driving the unit pixels.

FIGS. 22A to 22E are timing charts of the operation timings of the control pulses shown in FIG. 21.

FIG. 23 to FIG. 28 are explanatory views of the potential levels in the present embodiment, wherein the ordinates correspond to the potential level (V), and the abscissas correspond to the location for forming each element on the substrate surface. Note that components common to those of FIG. 3 to FIG. 7 which have been already explained are assigned the same notations.

Figure 22:
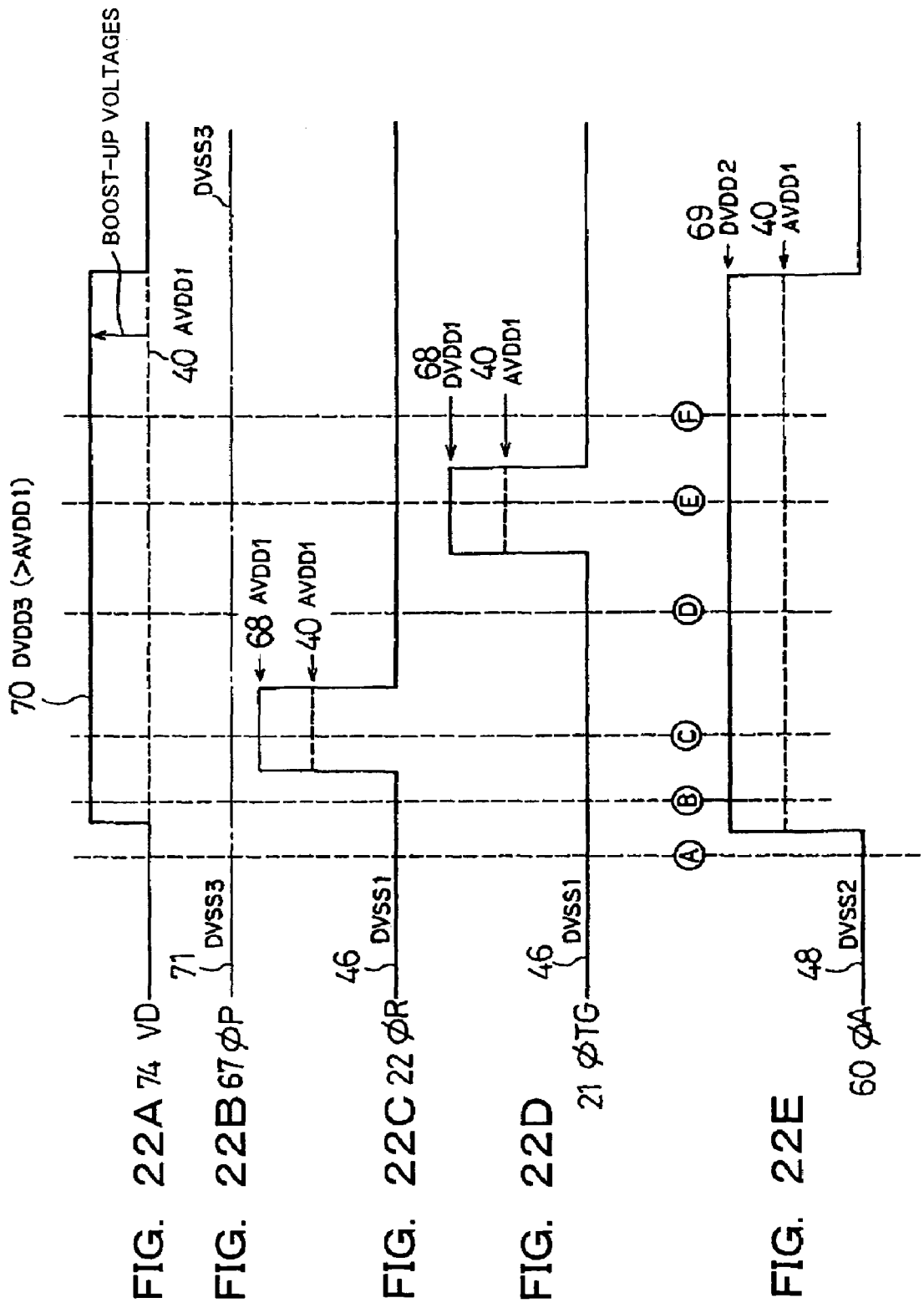
FIGS. 22A to 22E are timing charts of operation timings of the embodiment shown in FIG. 21.
Figure 23:
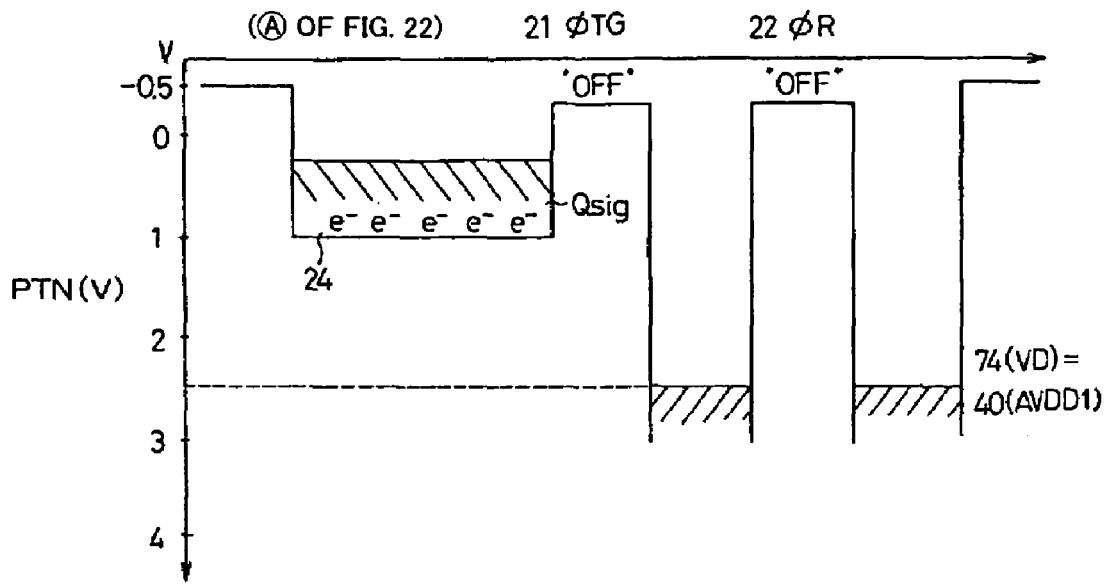
FIG. 23 is an explanatory view of the transition of the potential level of the embodiment shown in FIG. 21.
Figure 24:
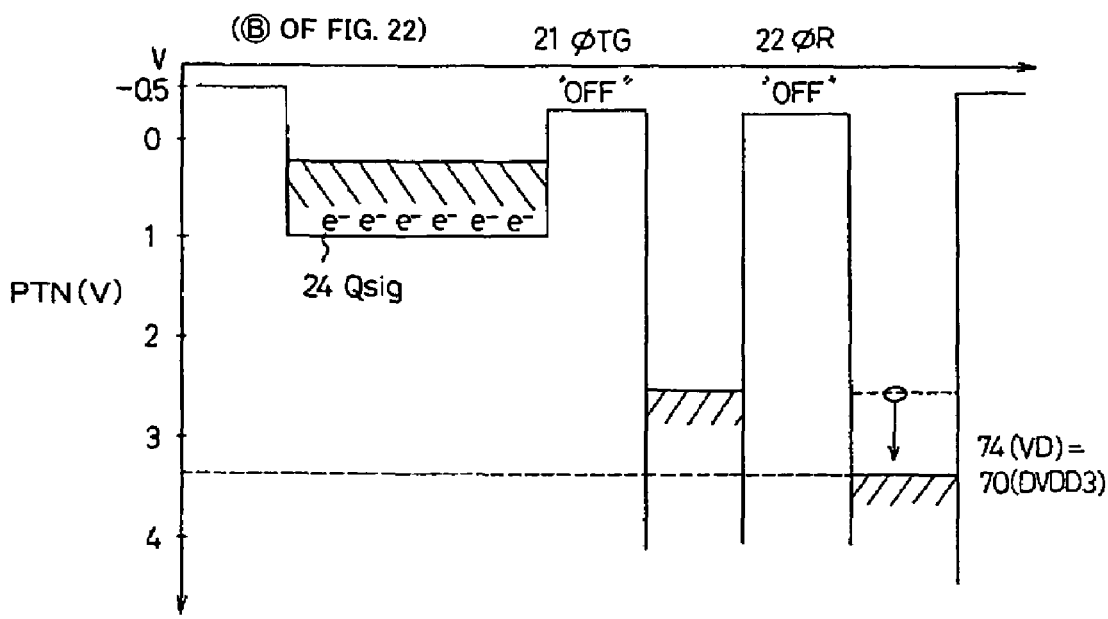
FIG. 24 is an explanatory view of the transition of the potential level of the embodiment shown in FIG. 21.

In the circuit of FIG. 21, a first state corresponds to FIG. 22A and FIG. 23.

Next, the booster circuit 52 is activated. By this, the booster circuit 52 operates, and boost-up voltages (DVDD1) 68, (DVDD2) 69, and (DVDD3) 70 are generated. That is, it corresponds to FIG. 22B and FIG. 24.

At this time, the voltage of a drain end 74 of the reset transistor 16 is VD. Next, the power supply voltage (DVDD2) is applied to the pulse (ΦA) 60 for selecting the selection transistor 57. Pixels are activated by this.

Figure 25:
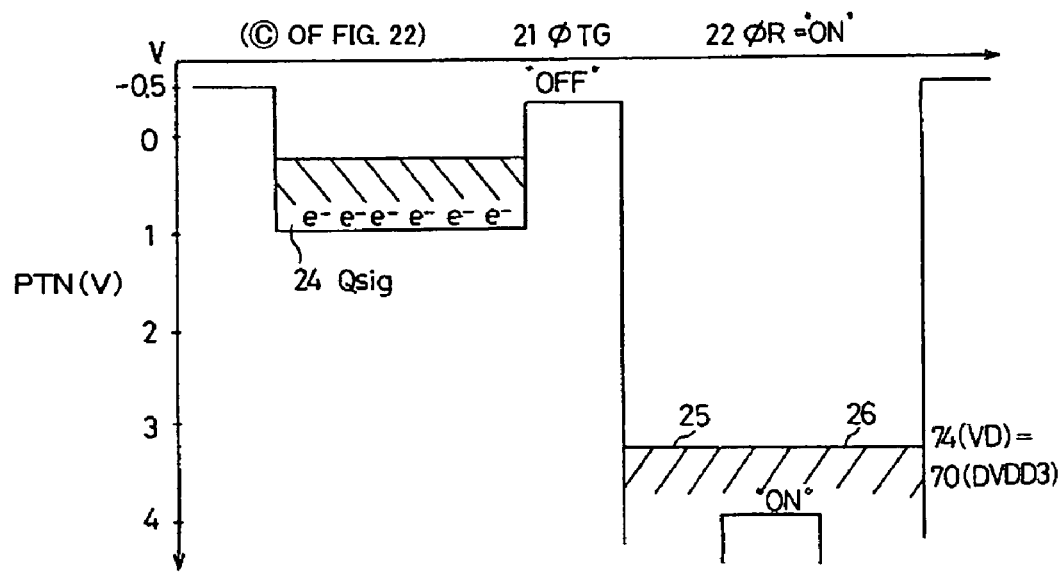
FIG. 25 is an explanatory view of the transition of the potential level of the embodiment shown in FIG. 21.
Figure 26:
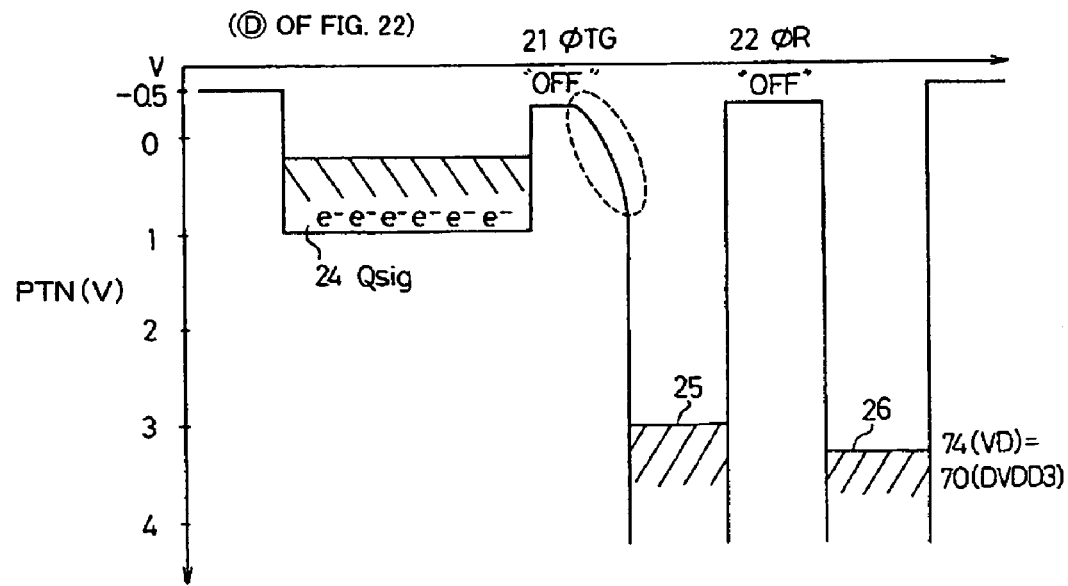
FIG. 26 is an explanatory view of the transition of the potential level of the embodiment shown in FIG. 21.

Next, the power supply voltage (DVDD1) is applied to the pulse (ΦR) 22 for selecting the reset transistor 16. FIG. 22C and FIG. 25 correspond. By this, the voltage of the charge detection unit 17 is set at the boost-up voltage DVDD3=VD. That is, this means that the charge detection unit 17 is reset to the boosted voltage DVDD3.

Next, the pulse (ΦR) 22 selected by the reset transistor 16 is made "OFF". This corresponds to FIG. 22D and FIG. 26.

Thereafter, the power supply voltage DVDD1 is applied to the transfer gate (TG) 18. This corresponds to FIG. 22E and FIG. 27. Due to this, the signal charge (Qsig) 24 of the charge detection unit 18 is read out to the charge detection unit 18. At this time, the voltage of the charge detection unit 18 is large, so the amount of the read signal charge can be made large. That is, it is possible to enlarge the dynamic range of the signal.

Figure 27:
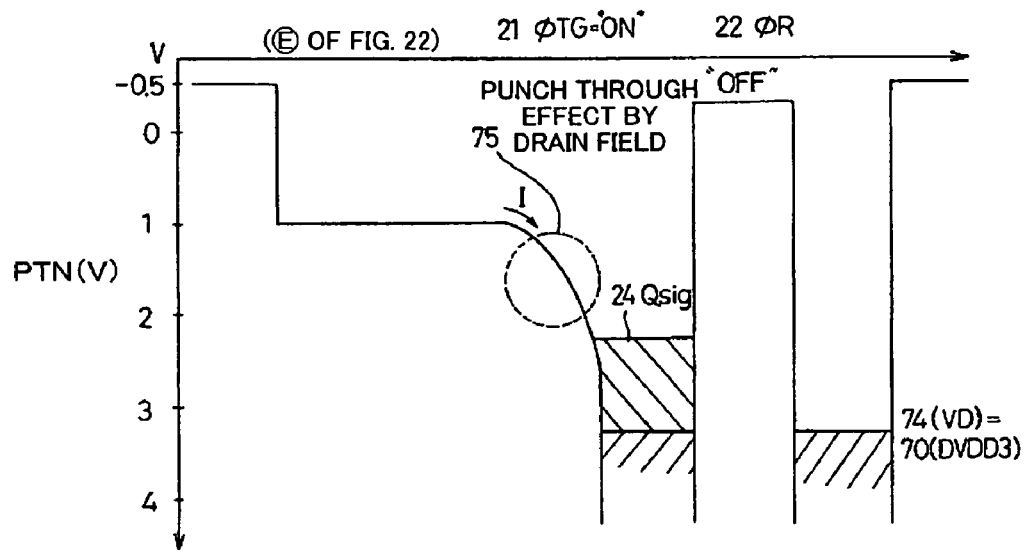
FIG. 27 is an explanatory view of the transition of the potential level of the embodiment shown in FIG. 21.
Figure 28:
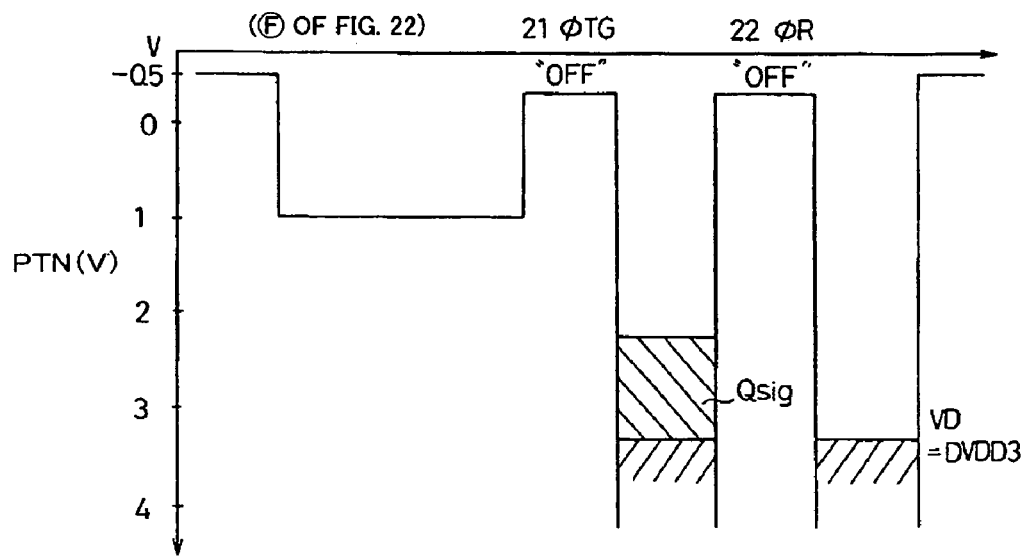
FIG. 28 is an explanatory view of the transition of the potential level of the embodiment shown in FIG. 21.

Further, as indicated by a broken line area 75 in FIG. 27, it is possible to obtain a punch through effect by a large drain field, so complete transfer becomes easy. That is, even if the power supply voltage (AVDD1) of the pixel becomes small, by using the present embodiment, it becomes possible to completely read out the signal charge of the photodiode.

The transfer gate (TG) 18 is made "OFF". This corresponds to FIG. 22F and FIG. 28.

Figure 29:
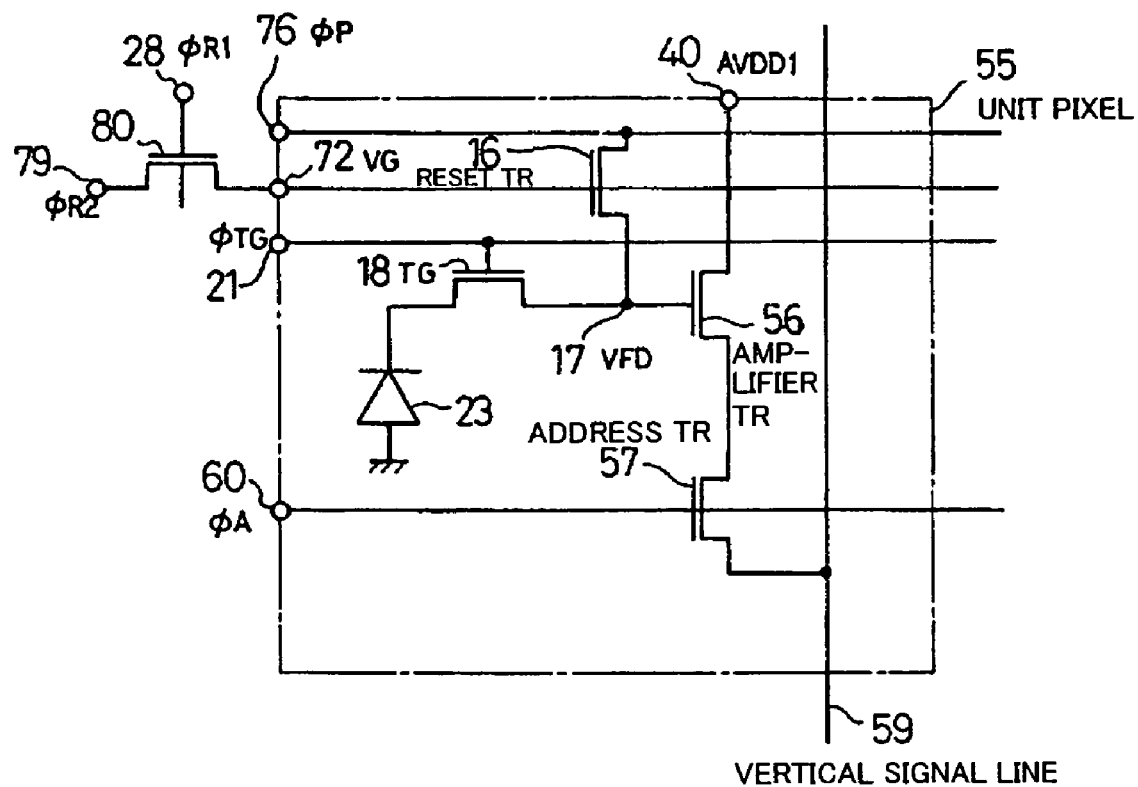
FIG. 29 is a block diagram of an example of the configuration of the unit pixel in a seventh embodiment of the present invention.
Figure 30:
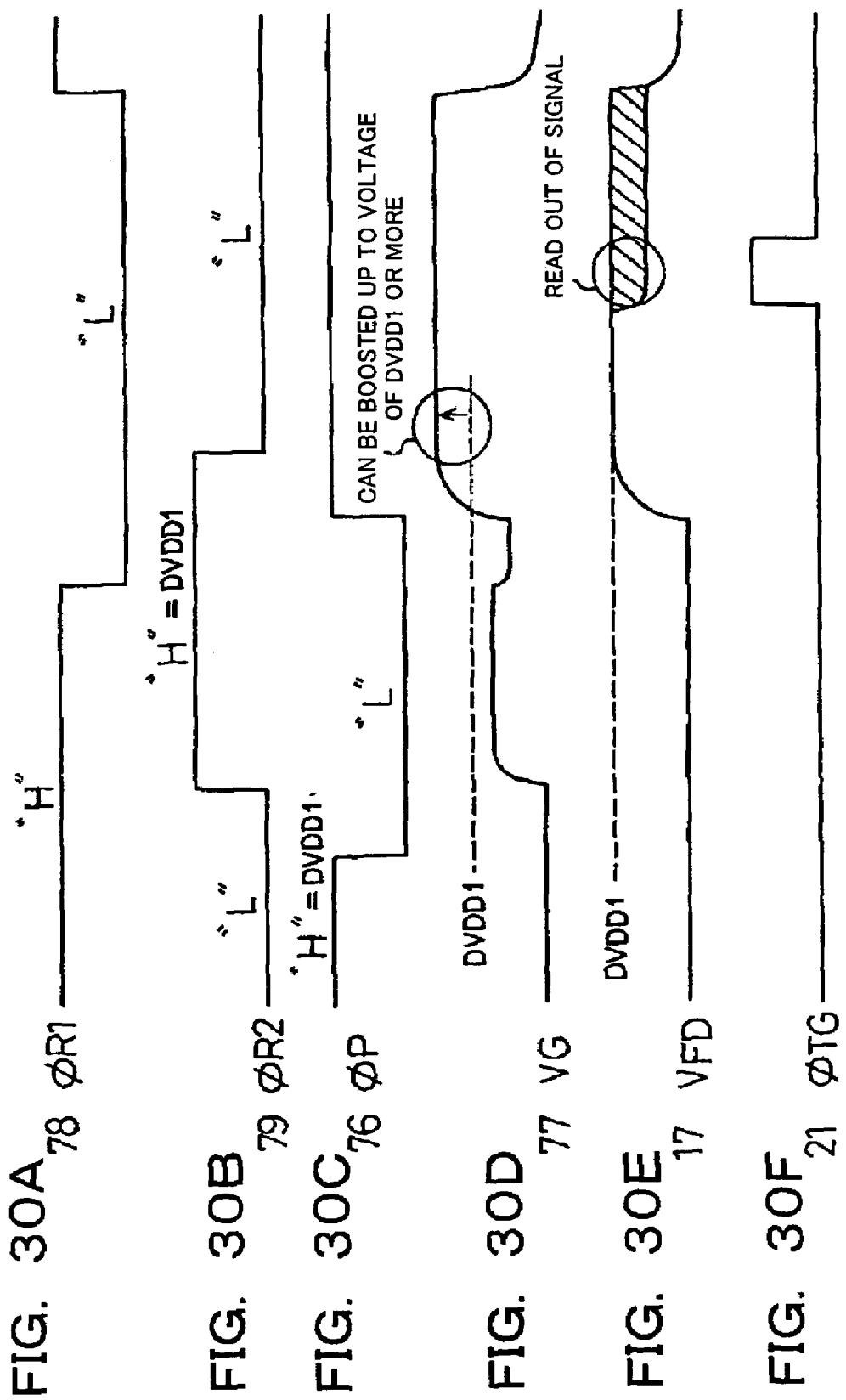
FIGS. 30A to 30F are timing charts of operation timings of the embodiment shown in FIG. 29.

FIG. 29 is a block diagram of an example of the configuration of the unit pixels in a seventh embodiment of the present invention, and FIGS. 30A to 30F are timing charts of operation timings of the control pulses shown in FIG. 29. In FIG. 29, the unit pixel 55 is comprised of a photodiode 23, a transfer gate 18, a charge detection unit 17, an amplifier transistor 56, a reset transistor 16, a selection transistor 57, etc.

The drain end of the amplifier transistor 56 is connected to the power supply voltage (AVDD1) 40 of the unit pixel 55, and the drain end of the reset transistor 16 is connected to the control line (Φp) 76.

Next, an explanation will be given of the operation of the unit pixel 55 by using FIGS. 30A to 30F.

First, it is switched from the state of ΦR1="H" and Φp="H" (second state) to Φp="H"→"L") (first state). Thereafter, ΦR2="L"→"H" and the pulse are applied. By this, the gate voltage (VG) of the reset transistor 16 rises from the ground potential GND.

Next, ΦR1 is made equal to "H"→"L", and then Φp is made equal to "L"→"H". By doing this, by coupling of the parasitic capacitance of the gate (VG) and the drain end (Φp) of the reset transistor 16, the gate voltage of the reset transistor rises and can be made DVDD1 or more. Due to this, the potential VFD of the charge detection unit 17 can be reset to DVDD1.

This is a method capable of completely resetting the charge detection unit 17 by the power supply voltage even if a booster circuit 52 or a depletion type transistor is not used and advantageous for the reduction of the number of masks etc.

Figure 31:
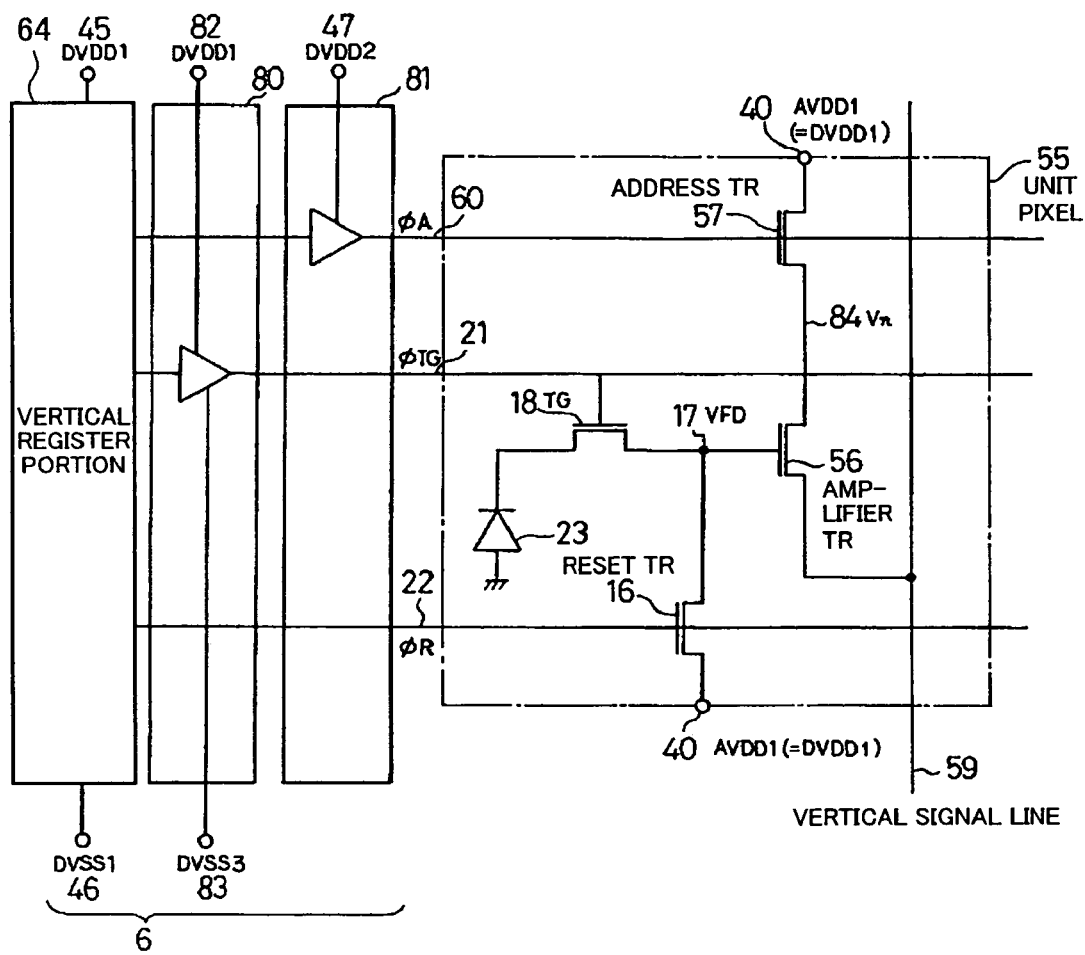
FIG. 31 is a block diagram of an example of the configuration of the unit pixel in an eighth embodiment of the present invention.

FIG. 31 is a block diagram of an example of the configuration of the unit pixels in an eighth embodiment of the present invention, and FIGS. 32A to 32E are timing charts of the operation timings of the control pulses shown in FIG. 31.

In FIG. 31, the unit pixel 55 is comprised of a photodiode 23, a transfer gate 18, a charge detection unit 17, an amplifier transistor 56, a reset transistor 16, a selection transistor 57, etc.

In the present embodiment, the sequence of analog power supply voltage terminal (AVDD1) 40→selection transistor 57→amplifier transistor 56→vertical signal line 59 is important. Below, this operation timing will be explained by using FIGS. 32A to 32E.

First, in a state where the pixel is not activated, the reset transistor 16 is made "ON". Then, the potential VFD of the charge detection unit 17 is set to the power supply DVDD1. In this example, DVDD1=AVDD1, so the voltage VFD of the charge detection unit 17 becomes the power supply voltage of the pixel.

Next, in order to activate the selection transistor 57, ΦA is applied. By this, the voltage Vn of the node 84 is boosted from 0V to intermediate voltage. The node 84 and the charge detection unit 17 are coupled by the parasitic capacitance, and the charge detection unit 17 is in the floating state, so the VFD of the charge detection unit 17 is boosted to a voltage larger than DVDD1 as indicated by 86 in FIG. 32E.

In this way, by making the timing 87 for reset earlier than the timing 88 for selecting the pixel, the potential VFD of the charge detection unit 17 can be boosted.

This can be realized by just the means of the drive timing, so transistors having different threshold values do not have to be used, and the booster circuit may be kept small.

Figure 33:
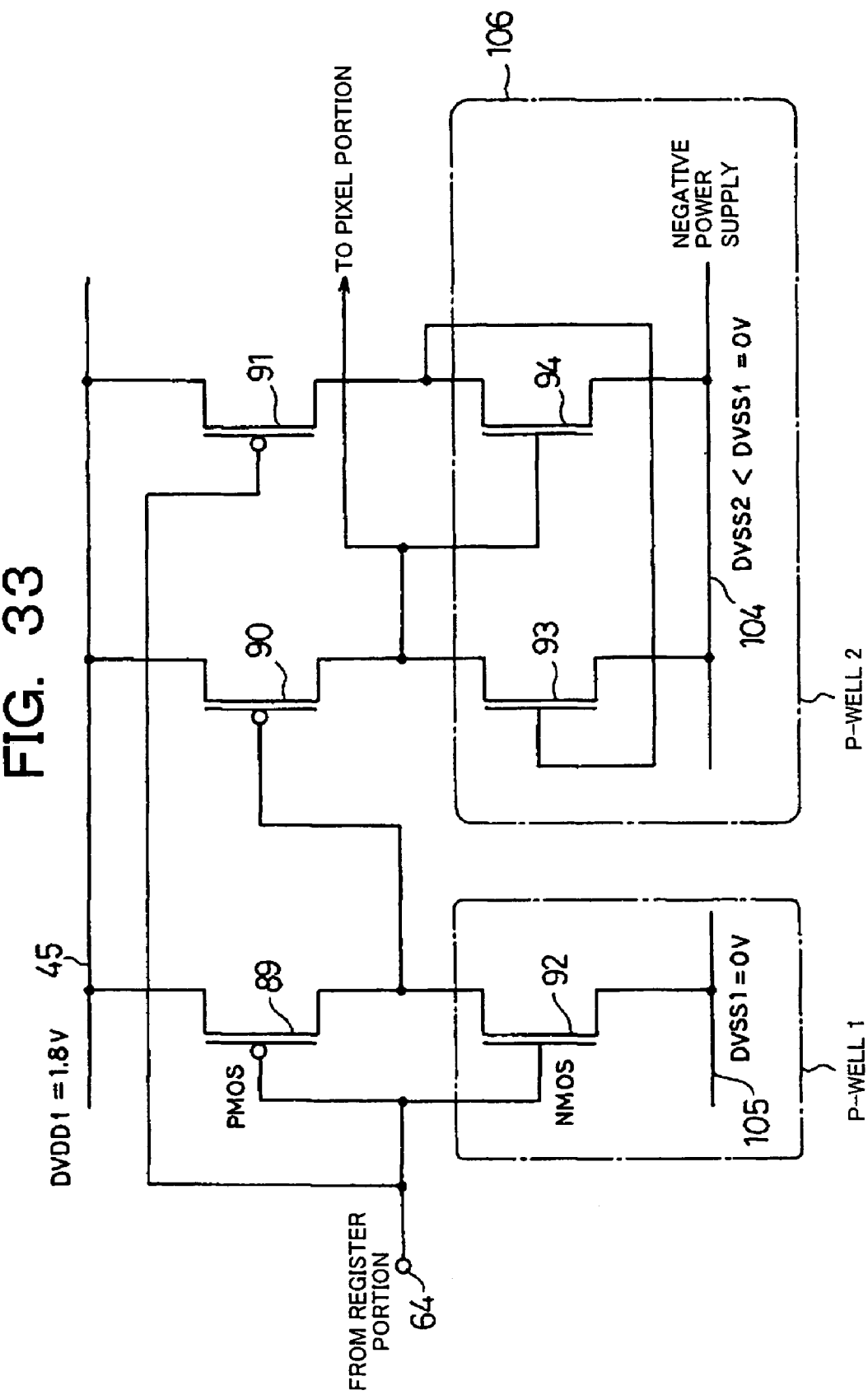
FIG. 33 is a block diagram of an example of the configuration of the unit pixel in a ninth embodiment of the present invention.

FIG. 33 is a block diagram of an example of the configuration of the unit pixels in a ninth embodiment of the present invention.

In the above eighth embodiment, as indicated by 83 in FIG. 32C, a voltage when not applying a pulse to the transfer gate was defined as the negative voltage (DVSS3). By this, a leakage current flowing into the photodiode during a storage period can be suppressed.

Accordingly, in the ninth embodiment, a concrete means for realizing the negative voltage as mentioned above will be explained.

For example, level shift circuits 80 and 81 etc. as shown in FIG. 31 have the structure shown in FIG. 33.

Namely, this level shift circuit has an inverter portion (transistors 89 and 92) receiving signals from the vertical register portion 64 and a circuit (transistors 90, 91, 93, and 94) for shifting the voltage on the GND side after that from DVSS1 (=0V) to DVSS2 (<0V).

By such a circuit configuration, if a negative voltage is applied to the DVDD2, when this level shift circuit is "OFF", the "negative voltage" will be applied to the transfer gate pulse ΦTG to the pixel portion 2.

Figure 34:
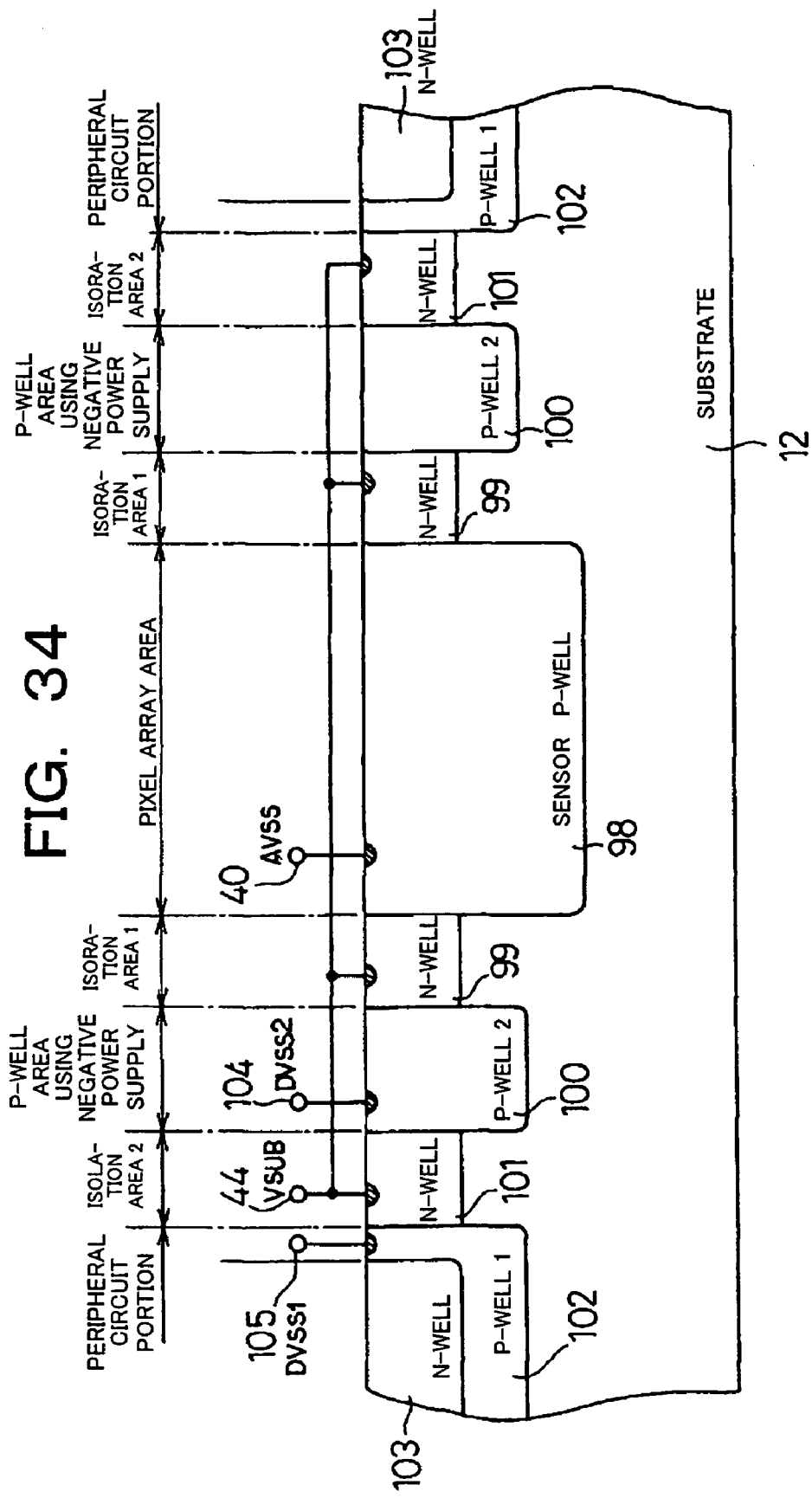
FIG. 34 is a schematic cross-sectional view of an example of the stack structure of a level shift circuit shown in FIG. 33.

FIG. 34 is a schematic cross-sectional view of a concrete example of the stack structure of such a level shift circuit. As illustrated, in the pixel portion 2 on the silicon substrate 12, a sensor P-well area 98 is formed overall, and a sensor P-well voltage (AVSS1) is applied.

Further, an N-well area 99 is formed so as to surround the periphery of this sensor P-well area 98, and a second P-well area 100 is formed outside of the same. Then, this second P-well area 100 is supplied with DVSS2 by the contact 104, and the overall P-well voltage becomes a negative voltage.

In this P-well area 100, a portion (transistors 93 and 94) of a broken line frame 106 shown in FIG. 33 will be formed.

Further, the outside of the second P-well area 100 is formed with an N-well area 101 and is formed with a substrate contact 44.

Note that a further outside peripheral circuit portion is formed by an N-well area 103 and a P-well area 102 etc., and the DVSS1 is applied to the P-well area 102 by a contact 105. By such a structure, it becomes possible to form a well structure for applying a negative voltage to the pixel portion 2.

Concrete examples of the configurations of the present invention were explained above, but the present invention can be widely employed in amplification type solid-state imaging devices (CMOS image sensors) having other structures as well. Very effective technology can be provided especially in the case of reducing the voltage.

As explained above, according to the solid-state imaging device of the present invention, since a plurality of power supply voltages were input from the outside and the plurality of power supply voltages were selectively supplied to the pixel portion and the peripheral circuit portion, by using the plurality of power supply voltages, setting the optimum power consumption for each portion becomes possible and, especially, the analog power supply voltage required for the pixel portion can be effectively set, so there are the effects that the operating margin of each portion is enlarged, the power consumption of the analog portion including the pixel portion can be reduced, and further it becomes possible to achieve complete transfer of the signal charge in the pixel portion.

Further, change of the threshold value Vth of the transistor, which is usually selectively set by the ion implantation mask, becomes unnecessary, so there is the effect that the number of masks at the ion implantation work can be greatly reduced and shortening of the process steps can be realized.

Further, according to the solid-state imaging device of the present invention, a plurality of power supply voltages were generated from the power supply voltage from the outside by using the level shifting means, and the plurality of power supply voltages were selectively supplied to the pixel portion and the peripheral circuit portion, therefore, by using a plurality of power supply voltages, setting the optimum power consumption for each portion becomes possible, and especially the analog power supply voltage required for the pixel portion can be effectively set, so there are the effects that the operating margin of each portion is enlarged, the power consumption of the analog portion including the pixel portion can be reduced, and further it becomes possible to achieve complete transfer of the signal charge in the pixel portion.

Further, change of the threshold value Vth of the transistor, which is usually selectively set at the ion implantation mask, becomes unnecessary, so there is the effect that the number of masks at the ion implantation work can be greatly reduced, and shortening of the process steps can be realized.

INDUSTRIAL APPLICABILITY

The solid-state imaging device of the present invention can set the optimum power consumption for each portion by using a plurality of power supply voltages and especially can effectively set the second power supply voltage required for the pixel portion, therefore the operating margin of each portion is enlarged, the power consumption of the analog portion including the pixel portion can be reduced, and further it becomes possible to achieve complete transfer of the signal charge in the pixel portion, so it is possible to maintain a good image quality and can be applied to an imaging device such as a digital camera.

The invention claimed is:

1. A solid-state imaging device having a pixel portion comprised of a plurality of unit pixels and a peripheral circuit portion for controlling the pixel portion, wherein the peripheral circuit portion operates with a first power supply voltage of a first power supply system and the pixel portion operates with a second power supply voltage of a second power supply system having a value different from that of the first power supply voltage, said solid-state imaging device comprising:
a first power supply inputting portion for receiving as input the first power supply voltage of the first power supply system from the outside and
a second power supply inputting portion for receiving as input the second power supply voltage from the outside and supplying the same to the pixel portion;
a column area for storing signals of each pixel row adjoining said pixel portion;
a level shifting unit for converting a level of said first power supply voltage and supplying a power supply voltage generated by said level shifting unit to a predetermined location; characterized in that:
said unit pixel has at least a photo-electric conversion unit generating a signal charge in accordance with an amount of light received, a charge detection unit for acquiring a signal charge generated by said photoelectric conversion unit, a transferring unit for transferring a signal charge generated by said photoelectric conversion unit to said charge detection unit, a resetting unit for resetting said photo-electric conversion unit, and an amplifying unit for converting a signal charge of said charge detection unit to an electric signal and outputting it to an output signal line, and
said level shifting unit supplies a level shifted power supply voltage to the transferring unit and resetting unit.

2. A solid-state imaging device as set forth in claim 1, characterized in that said level shifting unit supplies a power supply voltage value to the transferring means set higher than the power supply voltage value for supplying to said resetting unit.

3. A solid-state imaging device having a pixel portion comprised of a plurality of unit pixels and a peripheral circuit portion for controlling the pixel portion, wherein the peripheral circuit portion operates with a first power supply voltage of a first power supply system and the pixel portion operates with a second power supply voltage of a second power supply system having a value different from that of the first power supply voltage, said solid-state imaging device comprising:
a first power supply inputting portion for receiving as input the first power supply voltage of the first power supply system from the outside and
a second power supply inputting portion for receiving as input the second power supply voltage from the outside and supplying the same to the pixel portion; further comprising a vertical drive portion for driving said pixel portion, a source of a reset transistor forming a resetting unit connected to a charge detection unit, and a drain of said reset transistor controlled by a vertical drive portion.

4. A solid-state imaging device as set forth in claim 3, characterized in that a drain control line is supplied with a third power supply voltage during a period other than the read period of the signal charge and is supplied with a fourth power supply voltage higher than said third power supply voltage during the read period of the signal charge, the fourth power supply voltage is used for reset of said charge detection unit and a series of read operations including reading of the signal charge, and the applied voltage of said drain control line is returned to said third power supply voltage after the end of the read operation of said signal charge.

5. A solid-state imaging device as set forth in claim 3, characterized in that a thickness of a gate insulation film of each transistor of said pixel portion is larger than a thickness of a gate insulation film of transistors at the peripheral circuit portion other than said pixel portion.

6. A solid-state imaging device as set forth in claim 3, further comprising a control transistor for controlling a gate of said reset transistor to a floating state, holding a gate of said reset transistor at a second state to set it at a first voltage when said drain control line is a first state, then setting said drain control line to a second state to set the gate of the reset transistor to a second voltage larger than the first voltage by capacitance coupling.

7. A solid-state imaging device as set forth in claim 6, characterized in that said unit pixel further comprises a selection transistor for selecting a pixel row, Sets said reset transistor to the ON state to set said charge detection unit to the first voltage, sets said reset transistor to the OFF state to set said charge detection unit to a floating state, then sets said selection transistor to the ON state so as to boost said charge detection unit to the second voltage by the parasitic capacitance of the source of said selection transistor and said charge detection unit.

8. A solid-state imaging device as set forth in claim 6, characterized in that said unit pixel further comprises a selection transistor for selecting a pixel row, each said unit pixel has at least one power supply voltage source, a connection order in each unit pixel is the power supply voltage source, selection transistor, amplification transistor, and output signal line, and the order of driving said pixel portion is first to turn said reset transistor ON once, then turn said selection transistor ON so as to read out a signal charge of said photo-electric conversion unit.

9. A solid-state imaging device having a pixel portion comprised of a plurality of unit pixels and a peripheral circuit portion for controlling the pixel portion, wherein the peripheral circuit portion operates with a first power supply voltage of a first power supply system and the pixel portion operates with a second power supply voltage of a second power supply system having a value different from that of the first power supply voltage, said solid-state imaging device comprising:
a first power supply inputting portion for receiving as input the first power supply voltage of the first power supply system from the outside and
a second power supply inputting portion for receiving as input the second power supply voltage from the outside and supplying the same to the pixel portion;
a column area for storing signals of each pixel row adjoining said pixel portion;
at least one of said first and second power supply voltages is a negative power supply voltage; and further wherein a pixel portion area of the semiconductor substrate is formed with a first well area of a first conductivity type, the outer circumference is formed with a second well area of a second conductivity type, and a further outer circumference is formed with a third well area of the first conductivity type, and
said third well area is supplied with a negative power supply voltage, the inside of said third well area is formed with an n-channel insulating gate type field effect transistor, and a source of said n-channel insulating gate type field effect transistor and said third well area are made the same negative power supply voltage.

10. A solid-state imagine device having a pixel portion comprised of a plurality of unit pixels and a peripheral circuit portion for controlling the pixel portion, wherein the peripheral circuit operates with a first power supply voltage and the pixel portion operates with a second power supply voltage having a value different from that of the first power supply voltage, said solid-state imaging device comprising:
a power supply inputting portion for receiving as input a power supply voltage of a single level from the outside and
a level shifting unit for converting the level of the power supply voltage received as input by the power supply inputting portion to the first power supply voltage and/or second power supply voltage, wherein
the first rower supply voltage generated by the level shifting unit is selectively supplied to the peripheral circuit portion, and the generated second power supply voltage is selectively supplied to the pixel portion
said unit pixel has at least a photo-electric conversion unit generating a signal charge in accordance with an amount of light received, a charge detection unit for acquiring a signal charge generated by said photo-electric conversion unit, a transferring unit for transferring a signal charge generated by said photoelectric conversion unit to said charge detection unit, a resetting unit for resetting said photo-electric conversion unit, and an amplifying unit for converting a signal charge of said charge detection unit to an electric signal and outputting it to an output signal line, and
said level shifting unit supplies a level shifted power supply voltage to the transferring unit and resetting unit.

11. A solid-state imaging device as set forth in claim 10, characterized in that said level shifting unit supplies a power supply voltage value for supplying to the transfer ring unit set higher than the power supply voltage value for supplying to said resetting unit.

12. A solid-state imaging device having a pixel portion comprised of a plurality of unit pixels and a peripheral circuit portion for controlling the pixel portion, wherein the peripheral circuit operates with a first power supply voltage and the pixel portion operates with a second power supply voltage having a value different from that of the first power supply voltage, said solid-state imaging device comprising:
a power supply inputting portion for receiving as input a power supply voltage of a single level from the outside and
a level shifting unit for converting the level of the power supply voltage received as input by the power supply inputting portion to the first power supply voltage and/or second power supply voltage, wherein
the first power supply voltage generated by the level shifting unit is selectively supplied to the peripheral circuit portion, and the generated second power supply voltage is selectively supplied to the pixel portion further comprising a vertical drive portion for driving said pixel portion, a source of a reset transistor forming said resetting unit connected to said charge detection unit, and a drain of said reset transistor controlled by said vertical drive portion.

13. A solid-state imaging device as set forth in claim 12, characterized in that said drain control line is supplied with a third power supply voltage during a period other than the read period of the signal charge and is supplied with a fourth power supply voltage higher than said third power supply voltage during the read period of the signal charge, the fourth power supply voltage is used for reset of said charge detection unit and a series of read operations including reading of the signal charge, and the applied voltage of said drain control line is returned to said third power supply voltage after the end of the read operation of said signal charge.

14. A solid-state imaging device as set forth in claim 12, characterized in that a thickness of a gate insulation film of each transistor of said pixel portion is larger than a thickness of a gate insulation film of transistors at the peripheral circuit portion other than said pixel portion.

15. A solid-state imaging device as set forth in claim 12, characterized by further comprising a control transistor for controlling a gate of said reset transistor to a floating state, holding a gate of said reset transistor at a second state to set it at a first voltage when said drain control line is a first state, then setting said drain control line to a second state to set the gate of the reset transistor to a second voltage larger than the first voltage by capacitance coupling.

16. A solid-state imaging device as set forth in claim 15, characterized in that said unit pixel further comprises a selection transistor for selecting a pixel row, sets said reset transistor to the ON state to set said charge detection unit to the first voltage, sets said reset transistor to the OFF state to set said charge detection unit to a floating state, then sets said selection transistor to the ON state so as to boost said charge detection unit to the second voltage by the parasitic capacitance of the source of said selection transistor and said charge detection unit.

17. A solid-state imaging device as set forth in claim 15, characterized in that said unit pixel further comprises a selection transistor for selecting a pixel row, each said unit pixel has at least one power supply voltage source, a connection order in each unit pixel is the power supply voltage source, selection transistor, amplification transistor, and output signal line, and the order of driving said pixel portion is first to turn said reset transistor ON once, then turn said selection transistor ON so as to read out a signal charge of said photo-electric conversion unit.

18. A solid-state imaging device having a pixel portion comprised of a plurality of unit pixels and a peripheral circuit portion for controlling the pixel portion, wherein the peripheral circuit operates with a first power supply voltage and the pixel portion operates with a second power supply voltage having a value different from that of the first power supply voltage, said solid-state imaging device comprising:
a power supply inputting portion for receiving as input a power supply voltage of a single level from the outside and
a level shifting unit for converting the level of the power supply voltage received as input by the power supply inputting portion to the first power supply voltage and/or second power supply voltage, wherein
the first power supply voltage generated by the level shifting unit is selectively supplied to the peripheral circuit portion, and the generated second power supply voltage is selectively supplied to the pixel portion;
at least one of said plurality of power supply voltages is a negative power supply voltage; and
a pixel portion area of the semiconductor substrate is formed with a first well area of a first conductivity type, an outer circumference is formed with a second well area of a second conductivity type, and a further outer circumference is formed with a third well area of the first conductivity type, and
said third well area is supplied with a negative power supply voltage, the inside of said third well area is formed with an n-channel insulating gate type field effect transistor, and a source of said n-channel insulating gate type field effect transistor and said third well area are made the same negative power supply voltage.

* * * * *